(12) United States Patent
Diaz et al.

(10) Patent No.: US 11,097,349 B2
(45) Date of Patent: *Aug. 24, 2021

(54) METHOD AND SYSTEM FOR ADDITIVE MANUFACTURING USING A LIGHT BEAM

(71) Applicant: Etxe-Tar, S.A., Guipuzcoa (ES)

(72) Inventors: Javier Diaz, Guipuzcoa (ES); Jesus Dominguez, Guipuzcoa (ES); Paula Sancho, Guipuzcoa (ES)

(73) Assignee: ETXE-TAR, S.A., Elgoibar (ES)

( * ) Notice: Subject to any disclaimer, the term of this patent is extended or adjusted under 35 U.S.C. 154(b) by 0 days.

This patent is subject to a terminal disclaimer.

(21) Appl. No.: 15/930,185

(22) Filed: May 12, 2020

(65) Prior Publication Data

US 2020/0269319 A1 Aug. 27, 2020

Related U.S. Application Data

(63) Continuation of application No. 15/504,234, filed as application No. PCT/EP2015/068123 on Aug. 5, 2015, now Pat. No. 10,688,561.

(30) Foreign Application Priority Data

Aug. 20, 2014 (EP) .................... 14382319

(51) Int. Cl.
  *B22F 10/20* (2021.01)
  *B33Y 10/00* (2015.01)
  (Continued)

(52) U.S. Cl.
  CPC .......... *B22F 10/20* (2021.01); *B23K 26/082* (2015.10); *B23K 26/342* (2015.10); *B28B 1/001* (2013.01); *B28B 17/0081* (2013.01); *B29C 64/153* (2017.08); *B29C 64/386* (2017.08); *B33Y 10/00* (2014.12); *B33Y 30/00* (2014.12);
  (Continued)

(58) Field of Classification Search
  CPC .......... B22F 10/20; B22F 12/00; B22F 10/10; B22F 10/30; B29C 64/386; B29C 64/153; B33Y 30/00; B33Y 50/02; B33Y 10/00; B23K 26/082; B23K 26/342; Y02P 10/25; B28B 1/001; B28B 17/0081
  See application file for complete search history.

(56) References Cited

U.S. PATENT DOCUMENTS

| 10,688,561 B2 * | 6/2020 | Diaz | ................. B28B 1/001 |
| 2006/0157454 A1 * | 7/2006 | Larsson | ............. B33Y 10/00 219/121.8 |

(Continued)

*Primary Examiner* — Rebecca Janssen
(74) *Attorney, Agent, or Firm* — Snell & Wilmer L.L.P.

(57) ABSTRACT

The method comprises the steps of:
a) supplying building material; and
b) fusing the building material using a light beam (2);
wherein steps a) and b) are carried out so as to progressively produce the object out of the fused building material.
In step b), the beam (2) is projected onto the building material so as to produce a primary spot on the building material, the beam being repetitively scanned in two dimensions in accordance with a first scanning pattern so as to establish an effective spot (21) on the building material, said effective spot having a two-dimensional energy distribution. The effective spot (21) is displaced in relation to the object being produced to progressively produce the object by fusing the building material.

26 Claims, 16 Drawing Sheets

(51) Int. Cl.
*B29C 64/153* (2017.01)
*B23K 26/082* (2014.01)
*B23K 26/342* (2014.01)
*B29C 64/386* (2017.01)
*B33Y 30/00* (2015.01)
*B33Y 50/02* (2015.01)
*B28B 1/00* (2006.01)
*B28B 17/00* (2006.01)
*B22F 10/30* (2021.01)

(52) U.S. Cl.
CPC ............... *B33Y 50/02* (2014.12); *B22F 10/30* (2021.01); *Y02P 10/25* (2015.11)

(56) References Cited

U.S. PATENT DOCUMENTS

2013/0216836 A1* 8/2013 Grebe .................. B32B 5/16
428/411.1
2014/0234551 A1* 8/2014 Sparkes .................. B05B 3/001
427/554

* cited by examiner

METHOD AND SYSTEM FOR ADDITIVE MANUFACTURING USING A LIGHT BEAM

CROSS-REFERENCE TO RELATED APPLICATION

This application is a continuation of application Ser. No. 15/504,234 filed Feb. 15, 2017 for METHOD AND SYSTEM FOR ADDITIVE MANUFACTURING USING A LIGHT BEAM, which is hereby incorporated by reference in its entirety.

TECHNICAL FIELD

The present invention relates to the production of three-dimensional objects by additive manufacturing.

STATE OF THE ART

Three-dimensional objects can be produced in many ways, such as by molding in a mold or by removing material from a workpiece, for example, using chipping machines. However, during the last decades, so-called additive manufacturing (AM) has become increasingly popular. In additive manufacturing material is added to an object being produced, so as to build up the three-dimensional object. That is, additive manufacturing is based on addition of material rather than on removal of material.

Some AM technologies involve the use of an energy beam which is applied to a building material so as to fuse the building material. By progressively adding up layers of fused building material, the three-dimensional object is produced. Building materials include polymers, metals, ceramics and composites, and are often supplied in powder form. Here, a distinction has to be made between systems using an electron beam and systems using a light beam, generally a laser beam.

One example of an AM technology is the so-called power bed fusion (PBF) process. PBF processes include one or more thermal sources for inducing fusion between powder particles in a certain region of a powder layer corresponding to a cross-section of the product being formed, and means for adding and smoothing powder layers. A well-known example of this kind of process is the so-called Selective Laser Sintering (SLS) process, where a laser beam fuses a thin layer of powder (for example, a layer of powder having a thickness in the order of about 0.1 mm) in a region that corresponds to the cross-section of the object to be formed.

The powder is spread across a build area using a counter-rotating leveling roller, and is preheated to a temperature close to the melting point and/or glass transition temperature of the building material. The purpose of the preheating is to reduce the power requirements on the laser beam. Once the material has been distributed and preheated, a focused laser beam is projected onto the layer of building material, and the laser spot is displaced over a region of said layer so as to progressively fuse the material in this region. This region corresponds to a cross-section of the product to be formed, whereby the fusing of the building material in this region creates a slice of the product. Next, the building area is lowered and a new layer of building material is applied, supported by the fused building material and by the powder surrounding it. By repeating these steps, the product is built up slice by slice, until it is finished. There are at least four different fusion mechanisms that are used in PBF processes, namely: solid-state sintering, chemically-induced sintering, liquid-phase sintering and full melting. In commercially used processes, liquid-phase sintering and melting tend to dominate. Examples of SLS processes and systems are disclosed in US-2014/0079916-A1 and U.S. Pat. No. 6,215,093-B1.

Another AM technology involving the use of electromagnetic energy beams (typically laser beams) is the so-called beam deposition (BD) process. In this kind of process, the building material is heated while it is being deposited, by applying an energy beam to the building material. Whereas in the PBF process described above the building material is first deposited in a layer and then selectively heated by the energy beam, in BD processes the material is being heated and melted as it is being deposited. BD processes include laser-based metal deposition (LBMD) processes, typically involving a deposition head integrating one or more powder nozzles and laser optics. The process involves controlled relative movement between the deposition head and a substrate, by moving the deposition head, the substrate, or both. An example of a beam deposition system is disclosed in US-2012/0138258-A1. Examples of powder deposition nozzles are disclosed in US-2014/0015172-A1 and in WO-2008/003942-A2.

US-2013-0168902-A1 discloses a powder bed fusion system in which the melting area is detected by a sensor device, for the purpose of quality control.

US-2012/0266814-A1 describes how in order to deposit a relatively wide coating, this must be done by overlapping a series of clads side by side. It is explained that if only the laser beam diameter is increased, then the temperature at the center of the melt pool is such that high levels of vaporization of additive material may occur, or the substrate may melt to an excessive depth. Further, the surrounding substrate material may be disrupted to an excessive depth, etc. The document describes a system in which the laser beam is shaped in a beam shaping apparatus involving a plane mirror and a diffractive optical element, so as to provide for beam energy distribution different from the traditional Gaussian one, to improve the process. For example, the intensity can be arranged to be relatively high at the leading edge of the laser spot, or at the edges of the laser spot.

US-2013/0300035-A1 discloses a powder bed fusion system and emphasizes the need to control the temperature of the irradiated building material in order to avoid geometrical deformations and cracks and to assure thorough fusion. It also mentions the need to reduce production time and the need to sweep the beam as efficiently as possible over the selected area. It mentions how a scan pattern can be used having parallel lines and how there is a need to take into account heat from previously scanned lines, which can be done by varying beam power or speed. The document proposes a method involving calculations related to an established beam path and an imaginary beam. The invention disclosed in this document relates to a method where the energy deposition of the beam to be used can be pre-adjusted based on calculations.

US-2011/0305590-A1 discloses a beam deposition arrangement where, in one embodiment, laser radiation is processed so as to generate a relatively high intensity region used to consolidate the powder, and a relatively low intensity region used to heat a substrate to mitigate distortion of the substrate during fabrication.

Generally, fusing of the selected region or portion of a layer is obtained by scanning the laser beam over the region following a beam path, so that the laser spot projected onto the layer is displaced over the surface of the layer to subsequently heat different portions of the region, typically a plurality of parallel tracks, until the entire region has been heated and fused to the desired extent. US-2004/0099996-A1 teaches an example of how radiation energy is applied in tracks. US-2006/0215246-A1 discloses how there are two types of laser scanning commonly performed in rapid-prototyping systems: raster scanning and vector scanning. US-2004/0200816-A1 also teaches that raster scanning and/or vector scanning were used to fill the area to be fused, for example, by fusing the powder along an outline of the cross section in vector fashion either before or after a raster scan that fills the area. This document suggests the use of a thermal image feedback for controlling temperature, for example, by controlling beam power and/or scan speed.

US-2003/127436-A1 teaches a way of reducing the build time of an article by reducing the number of raster scan lines required for each cross-section of the article.

US-2003/0028278-A1 teaches raster scanning with a selected line-to-line distance between scans, with the location of the scan lines substantially centered between the locations of the scan lines in the previous layers. Thereby, the number of scans required for the formation of an article can be reduced, without degrading the structural strength.

DE-10112591-A1 teaches some alternative laser scanning patterns in the context of additive manufacturing.

U.S. Pat. No. 5,904,890-A teaches adapting the speed with which the laser beam and laser spot are displaced along the lines of the scanning pattern, depending on the length of the lines, in order to achieve a more homogeneous density distribution.

US-2013/0216836-A1 teaches, in the context of a melting/sintering process, the use of a non-linear scanning path to reduce the time for the beam of the electromagnetic radiation source to traverse an area.

US-2014/0154088-A1 teaches the relation between secondary grain orientation and scanning pattern of an energy beam.

DE-102009015282-A1 teaches the application of different amounts of energy to different portions of the layer that is being selectively sintered or melted, based on a function or on data in a table. Thereby, the mechanical characteristics of the product can be improved.

US-2011/0168090-A1 and US-2011/0168092-A1 teach laser deposition apparatuses having wide spray nozzles, so that a relatively wide coating of uniform thickness can be deposited. The wide nozzles are combined with a wide laser beam, which can be obtained by means of beam manipulation techniques such as, for example, scanning.

US-2010/0036470-A1 discloses processes for laser based fabrication of electrodes and mentions process control by parameters including laser energy and laser spot size. US-2008/0296270-A1 discloses direct metal deposition using a laser and powder nozzle, with a control system for controlling process parameters including laser power and traverse speed. Also laser beam power is mentioned as a process parameter. US-2006/0032840-A1 teaches the adaptation of the laser power based on feedback control. US-2009/0206065-A1 teaches selected laser powder processing with adjustment of process parameters including laser power and/or laser spot size. US-2002/0065573-A1 mentions parameters such as laser power, beam diameter, temporal and spatial distribution of the beam, interaction time, and powder flow rate. The document proposes the use of a diode laser for rapid response and fine tuning to the process at a fast rate.

WO-2014/071135-A1 teaches, in the context of additive manufacturing, the concept of appropriately modulating a laser beam pulse to accurately and precisely control the amount of heat applied to a powder material, particularly for the purpose of achieving much finer control of the characteristics of the final object produced by the method.

US-2006/0119012-A1 teaches a method for producing parts using laser sintering wherein a fusible powder is exposed to a plurality of laser scans at controlled energy levels and for time periods to melt and densify the powder.

CN-1648802-A discloses the use of a high energy beam to sinter or melt and deposit material successively. The document appears to teach fast scanning using an electron beam. Through one or several frames of scanning, the material in the forming area has its temperature synchronously raised to reach the sintering or re-melting temperature for deposition onto the forming area before synchronous cooling. This is believed to reduce heat stress and raise forming precision and quality.

US-2010/0007062-A1 discloses homogeneously preheating powder material by scanning with a high energy beam along predetermined paths over a pre-heating area.

DE-10208150-B4 teaches that the roughness of the surface of the object being produced can be reduced by letting the laser beam scanning the corresponding portion of the powder layer oscillate back and forth in the direction of its general movement along the track, thereby heating the same portion several times. The document also teaches that a movement in the lateral direction can be added to this movement in the longitudinal direction of the track, for the purpose of setting or varying the width of the track. The method including the movement of the laser spot forth and back along the track can also be used for other parts of the layer being fused, not only for the one defining the surface of the object. The speed, size or power of the laser spot can be modified during this movement forth and back. The document indicates that the laser can create moving Lissajous figures.

US-2003/0075529-A1 discloses the use of adjustable focusing optics to control the beam geometry in the context of a beam deposition process. Parameters such as road width and intensity distribution can be controlled. A vibrating or oscillating element can be used so that the road width can be determined by adjusting the amplitude of the oscillation.

US-2001/0002287-A1 teaches the use of beam shaping optics to create non-symmetric laser beams, including laser beams with a leading portion having a higher laser beam intensity than a trailing portion, imposing a thermal gradient upon the deposited material during re-solidification.

US-2012/0267345-A1 teaches how, in the context of additive manufacturing, the cross sectional shape of the laser beam is adjusted during the process to control the distribution of energy, using a deformable reflective means such as a deformable mirror.

Not only a laser beam but also an electron beam can be used for additive manufacturing. However, in the case of an electron beam, the cross section of the beam cannot be shaped using optics in the same way as with a laser beam, and a different approach has to be taken. WO-2004/056509-A1 teaches inter alia the use of an electron beam for producing a three-dimensional object, and suggests the use of an interference term in order to provide a more favorable heat distribution in an area around the focal point or to provide for a widened trace. The use of a movement with a component in a direction perpendicular to the main movement direction may be especially advantageous in the context of an electron beam, in order to provide for some kind of effective heated spot being wider than the focal point of the electron beam, that is, similar to what can be achieved by using appropriate optics when the energy beam is a laser beam. Scanning an electron beam to create more or less complex figures is well known in the art, cf. for example how this concept has been implemented for decades in cathode ray tubes. It is well known in the art to control the direction of electron beams using magnetic fields, without the need for physical displacement of components.

As explained in, for example, US-2002/0145213-A1, selective laser sintering has traditionally been based on a spot by spot or point by point approach. US-2002/0145213-A1 suggests a different technique, based on the creation of transferable powder toner images of a binding powder and at least a modifier powder in accordance with the corresponding CAD design. The build-up of the object takes place area by area, instead of point by point.

US-2008/0038396-A1 teaches the production of three-dimensional objects by solidification of a building material using electromagnetic radiation. The energy input is via an imaging unit comprising a predetermined number of pixels.

US-2003/0052105-A1 suggests a pixel approach for laser sintering, including, for example, the use of a digital micro-mirror device.

US-2002/0051853-A1 discloses production of an object layer by layer, using a single laser beam to outline the features of the object being formed, and then a series of equally spaced laser beams to quickly fill in the featureless regions, thereby speeding up the process.

WO-2014/016402-A1 discloses a device comprising a galvanometric head able to steer a laser beam toward each point of a maximum sintering zone of a sintering field when said galvanometric head is positioned at a predetermined position. The device further comprises limiting means able to limit the steering of the laser beam to an effective sintering zone situated inside said maximum sintering zone, and movement means for moving said galvanometric head in a plane parallel to the plane of said sintering field, allowing said galvanometric head to be positioned at at least two different positions, an effective sintering zone being associated with each position of said galvanometric head.

CN-103567441-A discloses a method for laser sintering wherein the size of the laser spot is modified during the process to speed up the process.

CN-203227820-U discloses a method wherein the size of the laser spot is modified during the process to adapt the size to the width of the component being manufactured.

U.S. Pat. No. 5,753,171-A teaches the use of a variable focusing device whereby the focus of the light beam can be varied during solidification of a layer, so that different parts of the layer are subjected to heat treatment with different beam diameters.

WO-2014/006094-A1 discloses a method comprising a step of acquiring the geometric outline of a two-dimensional section to be fused; a step of determining a reference path from said geometric outline of the section, said reference path having a shape that is correlated with the shape of said geometric contour; a step of determining a set of paths on the basis of said reference path; and a step of controlling the laser beam such that it moves along the set of predetermined paths according to a moving strategy defining an order of the paths along which to move, and, for each path, a point from which to start moving. This method aims at enhancing productivity.

US-2013/0270750-A1 acknowledges that process speed cannot be increased simply by increasing power and/or scanning speed: increased power can end up producing vaporization, whereas increased scanning speed reduces the dwell time which may end up being too short. This document suggests an approach based on the simultaneous use of two laser beams.

US-2005/0186538-A1 teaches that the production time can be reduced when the energy of a high-energy beam is coupled into the material in a plurality of steps. In the first step, the energy is coupled into a certain position in the layer of material until the respective portion of the layer at said position has been heated to a temperature just below its melting point. In the final step of coupling in energy, the beam then heats said portion above the melting point, thereby fusing the material to the layer below it. In this way, the product being made is formed.

WO-2013/079581-A1 discloses how the energy input per unit time can be varied as a function of the respective irradiation site on the powder layer, taking into account the heat removal capability of a defined directly surrounding region. Energy input is appropriately modulated automatically by setting of the irradiation parameters such as energy density of the radiation at the irradiation site and/or duration of the irradiation of the irradiation site.

DE-10320085-A1 relates to laser sintering or laser melting processes and discusses adaptation of the laser heating by adapting features such as power density, scanning speed, width of the track, distance between the tracks, laser beam diameter, and beam power, during the production of an object.

US-2004/0094728-A1 discloses a system in which the scanner is moveable above a platform on which the object is being formed, so as allow for the production of large objects with good quality.

WO-2014/037281-A2 discloses a method and system for laser hardening of the surfaces of workpieces, with a special focus on crankshafts. Laser hardening of steel is a well-known concept, but some workpieces are problematic due to the presence of more heat sensitive regions which can suffer damage when heated by the laser beam. For example, in the case of crankshafts, a problem resides in the presence of more heat sensitive portions such as the areas adjacent to the oil lubrication holes. WO-2014/037281-A2 teaches how this and similar problems can be overcome by using an effective laser spot with a two-dimensional energy distribution that can be dynamically adapted to avoid overheating of the more heat sensitive subareas.

DESCRIPTION OF THE INVENTION

A first aspect of the invention relates to a method for producing an object, the method comprising the steps of:
a) supplying building material; and
b) fusing the building material using a light beam;
wherein steps a) and b) are carried out so as to progressively produce the object out of the fused building material;
wherein in step b), the beam is projected onto the building material so as to produce a primary spot on the building material, the beam being repetitively scanned in two dimensions in accordance with a first scanning pattern so as to establish an effective spot on the building material, said effective spot having a two-dimensional energy distribution,
and wherein said effective spot is displaced in relation to the object being produced to progressively produce the object by fusing the building material.

The building material can be any building material suitable for additive manufacturing by fusion by heat applied with a light beam, such as a laser beam. In many embodiments of the invention, the building material is supplied in powder form. In many embodiments of the invention, the building material is selected from the group comprising metals, polymers, ceramics and composites, and mixtures or combinations thereof.

The term fuse (fusing, etc.) should not be interpreted narrowly and encompasses any alteration of the supplied building material suitable for manufacturing an object out of it. In the present document, the concept "fusion" encompasses fusion mechanisms such as solid-state sintering, chemically-induced binding, liquid-phase sintering and full melting.

The light beam is a beam of electromagnetic radiation, for example, a laser beam. The effective laser spot can be created and adapted using, for example, any of the techniques described in WO-2014/037281-A2, which is incorporated herein by reference. Whereas WO-2014/037281-A2 is focused on the laser hardening of previously produced workpieces, such as crankshafts, featuring heat-sensitive subareas such as the areas adjacent to the oil lubrication holes, it has been found that the principles disclosed therein regarding the scanning of the laser beam can be applied also to the area of additive manufacturing, where they can be used to enhance the manner in which building material is fused, in terms of velocity and/or quality.

In some embodiments of the present invention, the method is implemented as a powder bed fusion method, for example, as an SLS (Selective Laser Sintering) method. In other embodiments of the invention, the method is implemented as a beam deposition method, for example, as a laser beam deposition method.

The displacement of the effective spot in relation to the object being produced can be carried out in accordance with a second scanning pattern. That is, the real/primary spot, that is, the spot that is produced by the beam at any given moment, is scanned in accordance with a first scanning pattern to create the effective spot, and this effective spot can be displaced in accordance with the second scanning pattern. Thus, two types of movement are combined or overlaid: the movement of the primary spot in accordance with the first scanning pattern, and the movement of the effective spot in accordance with the second scanning pattern.

The term "two-dimensional energy distribution" refers to the manner in which the energy applied by the energy beam is distributed over the effective spot, for example, during one sweep of the beam along the first scanning pattern.

The present invention allows for a relatively rapid fusion of a substantial area, due to the fact that the effective spot can have a substantial size, such as, for example, more than 4, 10, 15, 20 or 25 times the size (area) of the primary spot. Thus, heating a certain region or area of the building material to achieve fusion can be accomplished more rapidly than if the heating is carried out by simply displacing the primary spot over the entire area, for example, following a scanning pattern made up of a plurality of parallel lines, arranged close to each other. The use of an effective spot having a relatively large area allows for high productivity while still allowing each portion of the building material to be heated for a relatively substantial amount of time, thereby allowing for less aggressive heating without compromising productivity. The primary spot can have an area substantially smaller than the one of the effective spot. For example, in some embodiments of the invention, the primary spot has a size of less than 4 mm$^2$, such as less than 3 mm$^2$, at least during part of the process. The size of the primary spot can be modified during the process, so as to optimize the way in which each specific portion of the object is being formed, in terms of quality and productivity.

On the other hand, the use of an effective spot created by scanning the primary spot repetitively in two dimensions in accordance with a first scanning pattern, makes it possible to establish an effective spot having a selected two-dimensional energy distribution, which is substantially independent of the specific optics (lenses, mirrors, etc.) being used, and which can be tailored and adapted to provide for an enhanced or optimized fusion of the building material and production of the object, from different points of view, including the speed with which the production takes place in terms of kg or units per hour, and quality. For example, the heat can be distributed so that a leading portion of the effective spot has a higher energy density than a trailing portion, thereby increasing the speed with which fusion is initiated, whereas the trailing portion can serve to maintain the fusion for a sufficient time to reach a desired depth and/or quality, thereby optimizing the velocity with which the effective spot can be displaced in relation to the object being produced, without renouncing on the quality of the fusion. Also, the two-dimensional energy distribution can be adapted in relation to the sides of the effective spot, depending on the characteristics of the building material or object at these sides, for example, so as to apply less heat in areas where the building material already features a relatively high temperature, for example, due to heating that has taken place recently, for example, during a preceding sweep of the effective spot in correspondence with an area adjacent to the one currently being heated. Also, the effective spot can be adapted in accordance to the shape of the object being formed, for example, the effective spot can be made thinner (that is, less wide) or wider in a direction such as the lateral direction (that is, the direction perpendicular to the direction in which the effective spot is being displaced along the second scanning pattern) when this is needed for the fusion of the building material in a certain area of the object being produced, for example, to correspond to the width of the portion of the object being produced in that area. For example, in some embodiments of the invention, the width of the effective spot can be dynamically adapted to match the respective dimension (such as width) of the respective portion of the object being produced at the different positions along a track along which the effective spot is swept, while the effective spot is swept along the track. Actually, not only the general or average width of the effective spot but also the shape of the effective spot, such as the way in which the width of the effective spot varies along the length of the effective spot, can be dynamically adapted, for example, to correspond to the shape of the respective portion of the object being formed at each moment. For example, the two-dimensional energy distribution can be adapted so that the projection of the effective spot onto the building material features a shape adapted to the shape of the object being formed, for example, to adopt a wedge-shape or similar in correspondence with a narrowing portion of the object being formed, etc.

The shape of the effective spot and/or the two-dimensional energy distribution can be adapted whenever needed, thereby adapting the process to the specific object that is being produced, and to the specific part of the object that is being produced at any given moment. In some embodiments of the invention, the two-dimensional energy distribution can be varied as a function of the respective irradiation site on the powder layer, taking into account the heat removal capability of a surrounding region. In some embodiments of the invention, the two-dimensional energy distribution can be varied taking into account desired characteristics of the product in different regions of the product, such as different requirements on porosity and/or hardness, for example, depending on the distance to a surface of the product. This can be useful in order to speed up sintering of areas requiring less hardness, thereby enhancing productivity.

Additionally, using the effective spot, created by the scanning of the primary spot in two dimensions, increases flexibility in terms of, for example, adaptation of a system to different objects to be produced. For example, the need to replace or adapt the optics involved can be reduced or eliminated. Adaptation can more frequently be carried out, at least in part, by merely adapting the software controlling the two-dimensional energy distribution of the effective spot.

The expression "first scanning pattern" does not imply that the primary spot must always follow one and the same scanning pattern when creating the effective spot, but is merely intended to distinguish the scanning pattern of the primary spot that is used to create the effective spot, from the pattern with which the effective spot is displaced or scanned in relation to the object being produced; the scanning pattern followed by the effective spot is sometimes referred to as a second scanning pattern.

In many embodiments of the invention, the velocity or mean velocity with which the primary spot is displaced in accordance with the first scanning pattern is substantially higher than the velocity with which the effective spot is displaced in relation to the object. A high velocity of the primary spot along the first scanning pattern reduces the temperature fluctuations within the effective spot during each sweep of the primary spot along the first scanning pattern.

In prior art systems, the melt pool or pool, that is, the area or region where fusion is taking place, substantially corresponds to the primary spot projected by the beam on the building material. That is, in prior art systems, the so-called melt pool where the building material is being fused generally has a size that substantially corresponds to the one of the primary spot, and the pool is displaced in accordance with the displacement of the primary spot, for example, along the circumference of a region to be fused, along raster scan lines filling an area where building material is to be fused, or along a line where building material is being deposited in a beam deposition process. Contrarily, in accordance with the present invention, the pool rather corresponds to the effective spot, or to a substantial portion thereof. For example, in many embodiments of the invention, the pool has a width substantially corresponding to the width of the effective spot (in a direction perpendicular to the direction in which the effective spot is being displaced), and the pool is generally displaced in accordance with the displacement of the effective spot. That is, rather than being displaced in accordance with the displacement of the primary spot following the first scanning pattern, the pool is displaced according to the displacement of the effective spot, such as following the second scanning pattern.

Of course, the present invention does not exclude the possibility of carrying out part of the fusion process operating with the primary spot in a conventional way. For example, the primary spot can be displaced to carry out the fusion in correspondence with the outline or contour of a region to be fused, or to carry out fusion in correspondence with certain details of the object being produced, whereas the effective spot described above can be used to carry out the fusion of other parts or regions, such as the interior or main portion of a region to be fused. The skilled person will chose the extent to which the effective spot rather than the primary spot will be used to create the pool, depending on issues such as productivity and the need to carefully tailor the outline of a region to be fused or a certain portion of an object being produced. For example, it is possible to use the primary spot to outline a region to be fused and to fuse the boundary between this region and the regions where the building material is not to be fused, while the effective spot is used it to fuse the building material within the outlined region. In some embodiments of the invention, during the process, the first scanning pattern can be modified to reduce the size of the effective spot until it ends up corresponding to the primary spot, and vice-versa.

That is, it is not necessary to use the effective spot to carry out all of the fusion that has to take place when producing the object. However, at least part of the fusion of building material is carried out using the effective spot described above. For example, it can be preferred that when producing an object, during at least 50%, 70%, 80% or 90% of the time during which the beam is applied to the building material, it is applied so as to establish the effective spot of the invention.

In some embodiments of the invention, the two-dimensional energy distribution of the effective spot is dynamically adapted during displacement of the effective spot in relation to the object being produced. Thereby, adaptation of the effective spot to the area or region of the object currently being produced can be accomplished. The expression dynamic adaptation is intended to denote the fact that adaptation can take place dynamically during displacement of the effective spot, that is, "in-process", without interrupting the process to, for example, switch between different optics, and without switching between different light beams. Different means can be used to achieve this kind of dynamic adaptation, some of which are mentioned below. For example, in some embodiments of the invention, the scanning system can be operated to achieve the dynamic adaptation (for example, by adapting the operation of galvanic mirrors or other scanning means, so as to modify the first scanning pattern and/or the velocity of the primary spot along the scanning pattern or along one or more segments or portions thereof), and/or the beam power and/or the size of the primary spot can be adapted. Open-loop or closed-loop control can be used for controlling the dynamic adaptation. The dynamic adaptation can affect the way in which the energy is distributed within a given area of the effective laser spot, and/or the actual shape of the effective laser spot, and can often affect the size and/or shape of the pool. For example, the length of the effective spot (for example, along the direction of movement of the effective spot) and/or the width of the effective spot (for example, perpendicularly to the direction of movement of the effective spot) can be adapted dynamically during the process, and/or "holes" (that is, areas where no energy or only very little energy is applied) can be established within the effective spot in correspondence with areas where no fusion of the building material is desired. The size and shape of the pool can be determined by the two-dimensional energy distribution.

In some embodiments of the invention, the two-dimensional energy distribution of the effective spot is dynamically adapted during displacement of the effective spot along a track, for example, to adapt the width of the effective spot to a corresponding dimension of a portion of the object being produced.

In some embodiments of the invention, the dynamic adaptation takes place once or a plurality of times, for example, continuously, during a sweep of the effective spot along a track, such as along the second scanning pattern or a portion thereof, for example, along a straight or curved portion of the second scanning pattern. For example, the width of the effective spot can be adapted one or more times, such as continuously, during a sweep of the effective spot along said track, such as along a straight or curved portion of the second scanning pattern.

In some embodiments of the invention, adaptation of the two-dimensional energy distribution of the effective spot is carried out by adapting the power of the beam, such as by selectively turning the beam on and off. This includes interruption of the beam at its source, as well as other options such as interruption of the beam by interference with the path of the beam, for example with a shutter, and combinations thereof. For example, when using a laser such as a fiber laser, the laser beam can be switched on and off very rapidly, thus making it possible to obtain a desired energy distribution by turning the laser beam on and off while following the scanning pattern. Thus, heating can be achieved by turning the laser beam on during certain lines or parts of lines of the scanning pattern. For example, a pixelized approach can be adopted, according to which the two-dimensional energy distribution is determined by the on/off state of the laser during the different portions or segments of the first scanning pattern.

In some embodiments of the invention, adaptation of the two-dimensional energy distribution of the effective spot is carried out by adapting the first scanning pattern.

In some embodiments of the invention, adaptation of the two-dimensional energy distribution of the effective spot is carried out by adapting the velocity with which the primary spot moves along at least a portion of the first scanning pattern.

That is, the two-dimensional energy distribution can be adapted by adapting, for example, the power of the beam—for example, by switching between different power states such as between on and off—, and/or by adapting the scanning pattern—for example, adding or leaving out segments, or modifying the orientation and/or the length of segments, or completely changing a pattern for another one—, and/or by adapting the velocity with which the beam moves along the scanning pattern, such as along one or more segments thereof. The choice between different means for adapting the two-dimensional energy distribution can be made based on circumstances such as the capacity of the equipment to rapidly change between power states of the beam, and on the capacity of the scanner to modify the pattern to be followed and/or the speed with which the primary spot moves along the scanning pattern.

In some embodiments of the invention, focus of the beam is dynamically adapted during displacement of the primary spot along the first scanning pattern and/or during displacement of the effective spot in relation to the object being produced. For example, the focus of the light beam along the optical axis can be dynamically modified during the process, for example, so as to vary or maintain the size of the primary spot while it is being displaced along the first scanning pattern, and/or while the effective laser spot is being displaced in relation to the object being produced. For example, the optical focus can be adapted to keep the size of the primary spot constant while the primary spot is moving over the surface of the object being produced (for example, to compensate for varying distances between the scanner and the position of the primary light spot on the object being produced).

In some embodiments of the invention, the size of the primary spot is dynamically adapted during displacement of the primary spot along the first scanning pattern and/or during displacement of the effective spot in relation to the object being produced, so as to modify the two-dimensional energy distribution and/or the size of the effective spot.

In some embodiments of the invention, during at least one stage of the method, the effective spot comprises a leading portion having a higher energy density than a trailing portion of the effective spot (this arrangement can be preferred when it is desired to rapidly reach a certain temperature, and thereafter provide sufficient energy input to, for example, keep the material at the required temperature for a certain amount of time), or the effective spot comprises a leading portion having a lower energy density than a trailing portion of the effective spot (this arrangement can be preferred when it is desired to first pre-heat the material for some time, prior to making it reach a certain temperature, such as the one at which fusion of the building material takes place). In some embodiments of the invention, the effective spot comprises an intermediate portion having a higher energy density than a leading portion and a trailing portion of the effective spot. In some embodiments of the invention, the effective spot features a substantially uniform energy distribution, with a substantially constant energy density throughout the effective spot.

As indicated above, the two-dimensional energy distribution can be adapted dynamically while the method is being carried out, for example, so that it is different in relation to different portions of the object that is being produced, and this adaptation can be carried out not only at a beginning and/or at an end of a track followed by the effective spot, but also within the track. For example, the two-dimensional energy distribution can be dynamically adapted in accordance with the shape of the portion of the object being formed at each moment, for example, as a function of the width of the portion to be formed, taking into account holes or openings in the object being formed, etc.

In some embodiments of the invention, the mean velocity of the primary spot along the first scanning pattern is substantially higher than the mean velocity with which the effective spot is displaced in relation to the object being produced. For example, the mean velocity of the primary spot along the first scanning pattern can preferably be at least ten times higher, more preferably at least 100 times higher, than the mean velocity with which the effective spot is displaced in relation to the object being produced. A high velocity of the primary spot reduces the temperature fluctuations within the effective spot during one sweep of the primary spot along the first scanning pattern.

In some embodiments of the invention, the beam is scanned in accordance with said first scanning pattern so that said first scanning pattern is repeated by the beam with a frequency of more than 10, 25, 50, 75, 100, 150, 200 or 300 Hz (i.e., repetitions of the scanning pattern per second). A high repetition rate can be appropriate to reduce or prevent non-desired temperature fluctuations in the areas being heated by the effective spot, between each scanning cycle, that is, between each sweep of the beam along the first scanning pattern. In some embodiments of the invention, the first scanning pattern remains constant, and in other embodiments of the invention, the first scanning pattern is modified between some or all of the sweeps of the beam along the scanning pattern.

In some embodiments of the invention, the size (that is, the area) of the effective spot, such as the mean size of the effective spot during the process or the size of the effective spot during at least one moment of the process, such as the maximum size of the effective spot during the process, is more than 4, 10, 15, 20 or 25 times the size of the primary spot. For example, in some embodiments of the invention, a primary spot having a size in the order of 3 $mm^2$ can be used to create an effective spot having a size of more than 10 $mm^2$, such as more than 50 or 100 $mm^2$. The size of the effective spot can be dynamically modified during the process, but a large mean size can often be preferred to enhance productivity, and a large maximum size can be useful to enhance productivity during at least part of the process, for example, when producing/fusing large internal areas of an object being produced.

In some embodiments of the invention, steps a) and b) are carried out repeatedly in a plurality of cycles, wherein each cycle comprises:
carrying out step a), supplying the building material as a layer;
carrying out step b) so as to fuse the building material in a region of said layer, said region corresponding to a cross section of the object being produced.

Thereby, using this approach, the object grows slice by slice, each slice having a thickness corresponding to the thickness of the fused portion of the layer. For example, this embodiment can encompass the implementation of the invention as a powder bed fusion process, for example, as an SLS process. The building material can, for example, be placed on a platform, which is displaced downwards a distance corresponding to the thickness of the fused region, each time step b) has been carried out. The building material can be in powder form and be distributed in a layer having a predetermined thickness using, for example, a counter-rotating powder leveling roller.

In some embodiments of the invention, steps a) and b) are carried out in parallel, so that the building material is fused by the effective spot as it is being supplied, providing for a continuous progressive growth of the object being produced. This option encompasses beam deposition processes. For example, the building material can be supplied in powder form and heated by the beam so as to melt, forming a melt pool. The object being produced or a substrate on which it is to be produced can be moved relative the laser beam whilst the building material continues to be delivered, whereby a trail of the melted building material is formed, cools and solidifies.

The method can be carried out under the control of a computer, with input data including those defining the structure of the object to be produced, for example, CAD data related to the structure of the object to be produced.

In some embodiments of the invention, the first scanning pattern is a polygonal scanning pattern comprising a plurality of lines. For example, the first scanning pattern can be a polygon such as a triangle, a square or a rectangle, a pentagon, a hexagon, a heptagon, an octagon, etc. The polygon does not need to be a perfect polygon, for example, the lines making up the polygon can in some embodiments be more or less curved and the edges of the polygon where the lines meet can be rounded, etc.

In some embodiments of the invention the first scanning pattern comprises a plurality of lines, such as a plurality of straight or curved lines, which in some embodiments of the invention are arranged substantially parallel with each other. In some embodiments of the invention, there are two, three, four or more of these lines.

In some embodiments of the invention, the first scanning pattern comprises at least three segments, and said scanning of the energy beam is carried out so that said beam or spot follows at least one of said segments more frequently than it follows at least another one of said segments. This arrangement is advantageous in that it enhances flexibility and the way in which the scanning pattern can be used to provide an adequate and, whenever desired, symmetric or substantially symmetric energy distribution. For example, one of said segments can be used as a path or bridge followed by the beam when moving between two other segments, so that the transfer of the spot projected by the beam between different portions (such as an end and a beginning) of the first scanning pattern can be carried out using segments (such as intermediate segments) of the scanning pattern for the transfer, whereby the transfer can often be carried out without turning off the beam and without distorting the symmetry of the two-dimensional energy distribution, when such symmetry is desired.

In some embodiments of the invention, the first scanning pattern comprises at least three substantially parallel straight or curved lines distributed one after the other in a first direction, said lines generally extending in a second direction, wherein said at least three lines comprise a first line, at least one intermediate line, and a last line arranged one after the each other in said first direction, wherein said scanning of the beam is carried out so that said beam or spot follows said intermediate line more frequently than said beam follows said first line and/or said last line. That is, for example, the beam can on an average follow said intermediate line twice as often as it follows said first line and said last line, for example, the beam can travel along the intermediate line each time it moves from the first line towards the last line, and vice-versa. That is, the intermediate line or lines can serve as a kind of bridge followed by the projected spot when moving between the first and the last line.

This arrangement has been found to be practical and easy to implement, and it has been found that adequate energy distributions can often be obtained by adapting scanning speed and without substantially adapting the power of the beam. It is also possible to modify the power of the beam during scanning so as to tailor the energy distribution, but rapid switching of the power is not always possible or desirable, and having the beam, such as a laser beam, at a low power level or switched off during substantial parts of the scanning cycle may imply a sub-optimal use of the capacity of the equipment, which can be a serious disadvantage when the equipment, such as a laser equipment, is used for additive manufacturing. Thus, it is often desirable to operate with the beam fully in the on state, to take full advantage of the available power.

It is often desirable to use three or more lines arranged in this way, that is, one after the other in a direction different from, such as perpendicular to, the direction along which the lines extend, in order to achieve a substantial extension of the effective spot not only in the direction along the lines, but also in the other direction, so as to make the effective spot adequate for heating a sufficiently wide area to a sufficiently high temperature and to maintain the temperature at the desired level or levels during sufficient time, while allowing the effective spot to travel with a relatively high speed, thereby allowing for a high productivity. Thus, a substantial extension of the effective spot in two dimensions is often an advantage.

In some embodiments of the invention, the first scanning pattern comprises at least three substantially parallel lines or segments, distributed one after the other in a first direction, such as in the direction along which the effective spot travels during the process, said lines extending in a second direction, such as in a direction perpendicular the first direction. In some embodiments of the invention, said at least three lines comprise a first line, at least one intermediate line, and a last line, arranged after each other in said first direction, and the scanning of the beam is carried out so that the projected spot is scanned along said lines according to a sequence in accordance with which the spot, after following said first line, follows said intermediate line, said last line, said intermediate line, and said first line, in that order.

The above definition does not mean that the scanning has to start with the first line, but just indicates the sequence according to which the beam tracks or follows the above-mentioned lines of the scanning pattern. Also, it does not exclude that in between (such as before or after) following some or all of the lines indicated above, the beam may follow other lines, such as lines interconnecting the first, last and intermediate lines, and/or additional intermediate lines.

That is, in these embodiments, after moving along the first line, the beam always follows said intermediate line twice before moving along the first line again. Whereas a more straight-forward approach might have been to carry out the scanning so that after said last line the beam and its projected spot return directly to said first line, it has been found that the sequence followed according to these embodiments of the invention is suitable to achieve a symmetric energy distribution about an axis of symmetry extending in said first direction.

In some embodiments of the invention, the scanning pattern comprises a plurality of said intermediate lines. The number of lines can be chosen by the operator or process designer or equipment designer depending on, for example, the size of the primary spot projected by the beam and the desired extension of the effective spot, for example, in the first direction. For example, a minimum number of lines can in some embodiments be three lines, but in many practical implementations a larger number of lines can be used, such as four, five, six, ten or more lines, when counting the first, the last and the intermediate lines. In some embodiments of the invention, the number of lines is modified to modify the energy distribution, while the effective spot is travelling along the surface area where fusion of the building material is to take place.

In some embodiments of the invention, the primary spot is displaced with a higher velocity along said at least one intermediate line than along said first line and last line. This is often preferred in order to achieve an adequate energy distribution in said first direction, at least during a portion or a substantial portion of the process. The higher velocity of the beam when moving along the intermediate lines, or at least when moving along one or some of them, compensates for the fact that the beam moves along said intermediate lines twice as often as it moves along the first and last lines. For example, the velocity of the primary spot along the intermediate lines can in some embodiments of the invention be about twice the velocity of the primary spot along the first and/or last lines. The velocity can be different for different intermediate lines. The velocity for each line can be chosen in accordance with a desired energy distribution in the first direction. Now, the velocity with which the effective spot is displaced along different lines or segments of the scanning pattern can be dynamically modified while the effective spot is travelling along the area where fusion of the building material is to take place, for example, to adapt the energy distribution to optimize the way in which the process is taking place, for example, in order to increase the quality of the product.

In some embodiments of the invention, the scanning pattern further comprises lines extending in said first direction, between the ends of the first, last and intermediate lines, whereby the primary spot follows said lines extending is said first direction when moving between said first line, said intermediate lines and said last line. In some embodiments of the invention, the primary spot is displaced with a higher velocity along said lines extending in the first direction, than along said first line and said last line, at least during part of the process.

In some embodiments of the invention, the beam is displaced along said first scanning pattern without switching the beam on and off and/or while maintaining the power of the beam substantially constant. This makes it possible to carry out the scanning at a high speed without taking into account the capacity of the equipment, such as a laser equipment, to switch between different power levels, such as between on and off, and it makes it possible to use equipment that may not allow for very rapid switching between power levels. Also, it provides for efficient use of the available output power, that is, of the capacity of the equipment in terms of power.

The use of electron beams for additive manufacturing is known in the art. The present invention uses a light beam, such as a laser beam, instead of an electron beam. A light beam such as a laser beam is preferred, due to issues such as cost, reliability, and availability. Appropriate scanning systems are available, for example, based on electronically controlled reflective means such as mirrors. In some embodiments of the invention, the power of the laser beam is higher than 1 kW, such as higher than 3 kW, higher than 4 kW, higher than 5 kW or higher than 6 kW, at least during part of the process. Traditionally, when a primary laser spot is raster scanned to fill the region of the building material to be fused, lasers having powers in the order of 400 W have often been used. With the present approach, based on the creation of a larger effective laser spot, higher powers can be used, whereby the productivity can be enhanced.

In some embodiments of the invention, the first scanning pattern can be implemented in line with the teachings of WO-2014/037281-A2, for example, in line with the teachings in relation to FIGS. 9-11 thereof.

Another aspect of the invention relates to a system for producing an object by additive manufacturing, the system comprising means for supplying building material, and means for producing a light beam, such as a laser beam, for selectively fusing the building material so as to progressively produce the object out of the fused building material. The system comprises a scanner for scanning the light beam in at least two dimensions. The system is arranged, such as programmed, for carrying out the method described above.

For example, the system can comprise a work table on which a three-dimensional object/product is to be built, a powder dispenser which is arranged to lay down a thin layer of powder on the work table for the formation of a powder bed, a device producing a beam for giving off energy to the powder whereby fusion of the powder takes place, means for controlling the beam across the powder bed for the formation of a cross section of the three-dimensional product through fusion of parts of said powder bed, and a computer in which information about successive cross sections of the three-dimensional product is stored, which cross sections build the three-dimensional product. The computer controls the means for guiding the beam across the powder bed to form the cross section of the three-dimensional object, and the object is formed by successive fusion of successively formed cross sections from powder layers successively laid down by the powder dispenser.

In some embodiments of the invention, the means for supplying building material comprise a powder spraying head comprising a frame defining an opening, the scanner being arranged in correspondence with said frame so as to scan the beam in two dimensions through said opening, the powder spraying head being arranged for distributing the building material in powder form in correspondence with said opening so that the building material can be selectively fused by the beam as it is being distributed. This arrangement is practical and allows for a controlled deposition and fusing of the building material. Suction means can be incorporated to remove the powder that has not been fused.

BRIEF DESCRIPTION OF THE DRAWINGS

To complete the description and in order to provide for a better understanding of the invention, a set of drawings is provided. Said drawings form an integral part of the description and illustrate embodiments of the invention, which should not be interpreted as restricting the scope of the invention, but just as examples of how the invention can be carried out. The drawings comprise the following figures.

DESCRIPTION OF WAYS OF CARRYING OUT THE INVENTION

Figure 1:
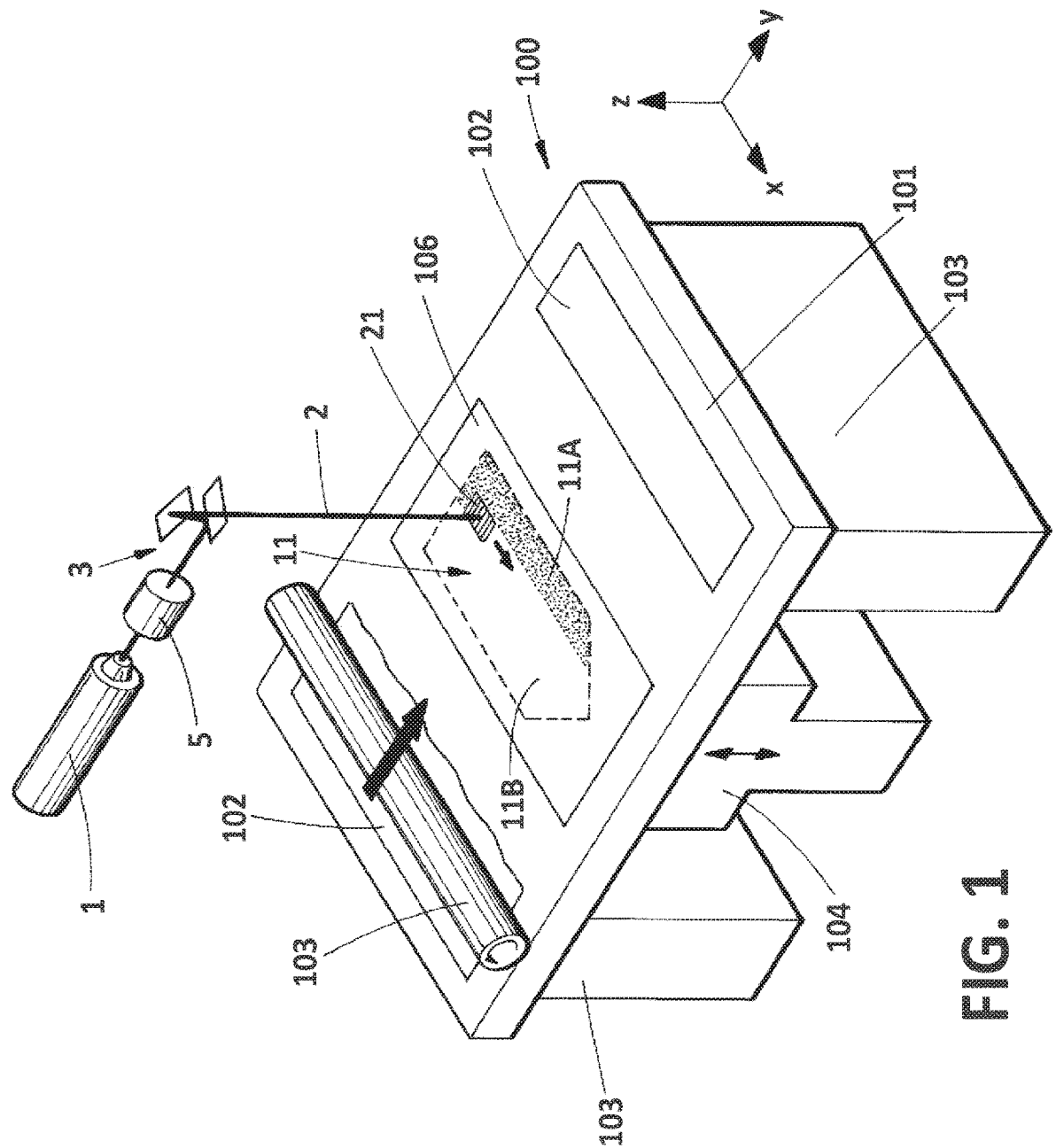
FIG. 1 is a schematic perspective view of a system in accordance with one possible embodiment of the invention, adapted for powder bed fusion.

FIG. 1 schematically illustrates an SLS system in accordance with one possible embodiment of the invention, for producing an object out of a building material that is supplied in powder form, such as metal powder. The system comprises a laser equipment 1 for producing a laser beam 2, and a scanner 3 including two mirrors or similar for two-dimensional scanning of the laser beam 2 in the horizontal (X-Y) plane. The equipment for producing a laser beam can, in some embodiments of the invention, be an equipment suitable for producing laser beams having a relatively high power content, such as 1 kW or more. One example of a suitable device is the Ytterbium Laser System Model YLS-6000-CT-Y13, by IPG Photonics, with a nominal power of 6 kW.

The system further comprises an arrangement for distribution of the building material, comprising a table-like arrangement with a top surface 101 with two openings 102 through which the building material is fed from two feed cartridges 103. In the center of the top surface 101 there is an additional opening, arranged in correspondence with a platform 104 which is displaceable in the vertical direction, that is, in parallel with a Z axis of the system. Powder is supplied from the cartridges 103 and deposited on top of the platform 104. A counter-rotating powder leveling roller 105 is used to distribute the powder in a layer 106 having a homogeneous thickness.

The laser beam is projected onto the layer 106 of the building material on top of the platform 104 to fuse the building material in a selected region or area 11, which corresponds to a cross section of the object that is being produced. Once the building material in this area 11 has been fused, the platform is lowered a distance corresponding to the thickness of each layer of building material, a new layer 106 of building material is applied using the roller 105, and the process is repeated, this time in accordance with the cross section of the object to be produced in correspondence with the new layer.

Traditionally, fusing was carried out by scanning the laser beam over the area 11 to be fused, for example, by making the projected laser spot follow a plurality of parallel lines extending across the area to be fused, until the entire selected area had been fused. In accordance with the present embodiment of the invention, the laser beam (and the primary laser spot that the beam projects on the building material) is repetitively scanned at a relatively high speed following a first scanning pattern (illustrated as a set of lines extending in parallel with the Y axis in FIG. 1), thereby creating an effective laser spot 21, illustrated as a square in FIG. 1. This is achieved using the scanner 3. This effective laser spot 21 is displaced according to a second scanning pattern, for example, in parallel with a plurality of parallel lines. In FIG. 1, an arrow indicates how the effective laser spot 21 can, for example, be displaced in parallel with the X axis of the system. FIG. 1 illustrates how a portion 11A of the area 11 to be fused has been fused during a preceding sweep of the effective laser spot 21 in parallel with the X axis, whereas another portion 11B is still waiting to be fused. After it has been fused, the platform 104 will be lowered and a new layer of building material in powder form will be applied.

The displacement of the effective laser spot 21 according to the second scanning pattern can likewise be achieved by the scanner 3, and/or due to displacement of the scanner or associated equipment, for example, along tracks (not shown in FIG. 1), such as tracks extending in parallel with the X axis and/or the Y axis.

In many variants of this embodiment, pre-heating means such as IR light sources or other heating devices are provided for pre-heating the powder layer, for example, to a temperature close to the melting point and/or glass transition temperature of the building material, thereby reducing the power that has to be applied by the laser beam to achieve the fusion of the building material. In other variants of the embodiment, or in addition to the pre-heating means, pre-heating can be carried out by a leading portion of the effective laser spot 21.

In some embodiments of the invention, the system can include means 5 for dynamically adapting the size of the primary spot (for example, so as to modify the two-dimensional energy distribution and/or the size of the effective laser spot 21) and/or the focus of the laser beam along the optical axis. This makes it possible to control (such as to vary or maintain) the size of the primary laser spot while it is being displaced along the first scanning pattern, and/or while the effective laser spot 21 is being displaced in relation to the object being produced. For example, the optical focus can be adapted to keep the size of the primary spot constant while the primary spot is moving over the surface of the object being produced (for example, to compensate for varying distances between the scanner and the position of the primary laser spot on the object being produced). For example, means for dynamically adapting the focus of the laser beam can in some embodiments of the invention comprise a varioSCAN® focusing unit, obtainable from SCANLAB AG (www.scanlab.de).

Figure 2:
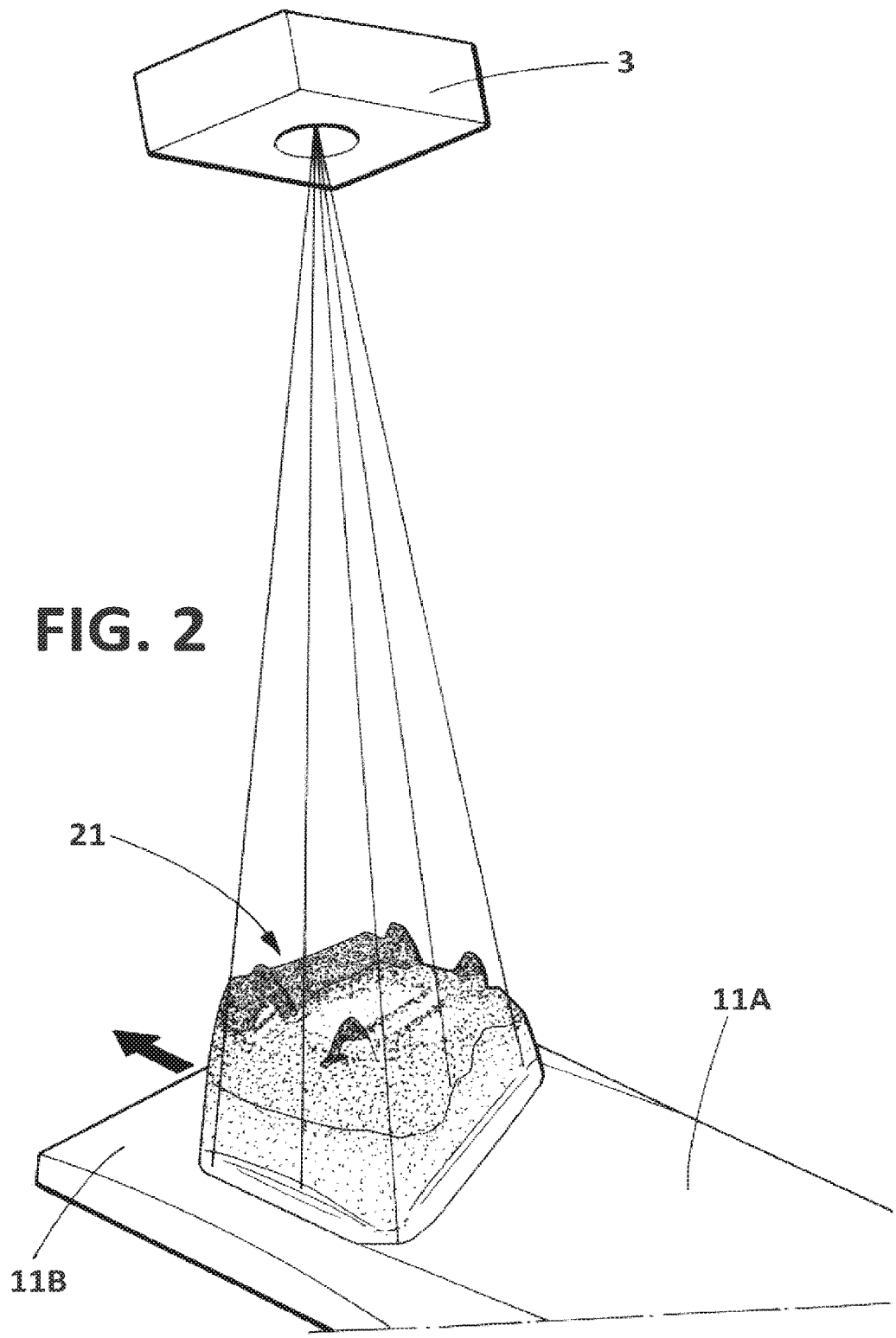
FIG. 2 schematically illustrates an example of the two-dimensional energy distribution.

FIG. 2 schematically illustrates how the effective laser spot 21 features a two-dimensional energy distribution where more energy is applied in some parts of the effective laser spot than in others during one sweep of the primary laser spot throughout the first scanning pattern. Here, the arrow indicates how the effective laser spot is travelling along a layer of metal powder, whereby the layer features a fused portion 11A and a portion 11B that has not yet been fused. Here, more energy is applied in correspondence with the leading portion than in correspondence with the trailing portion of the effective laser spot 21.

Figure 3A:
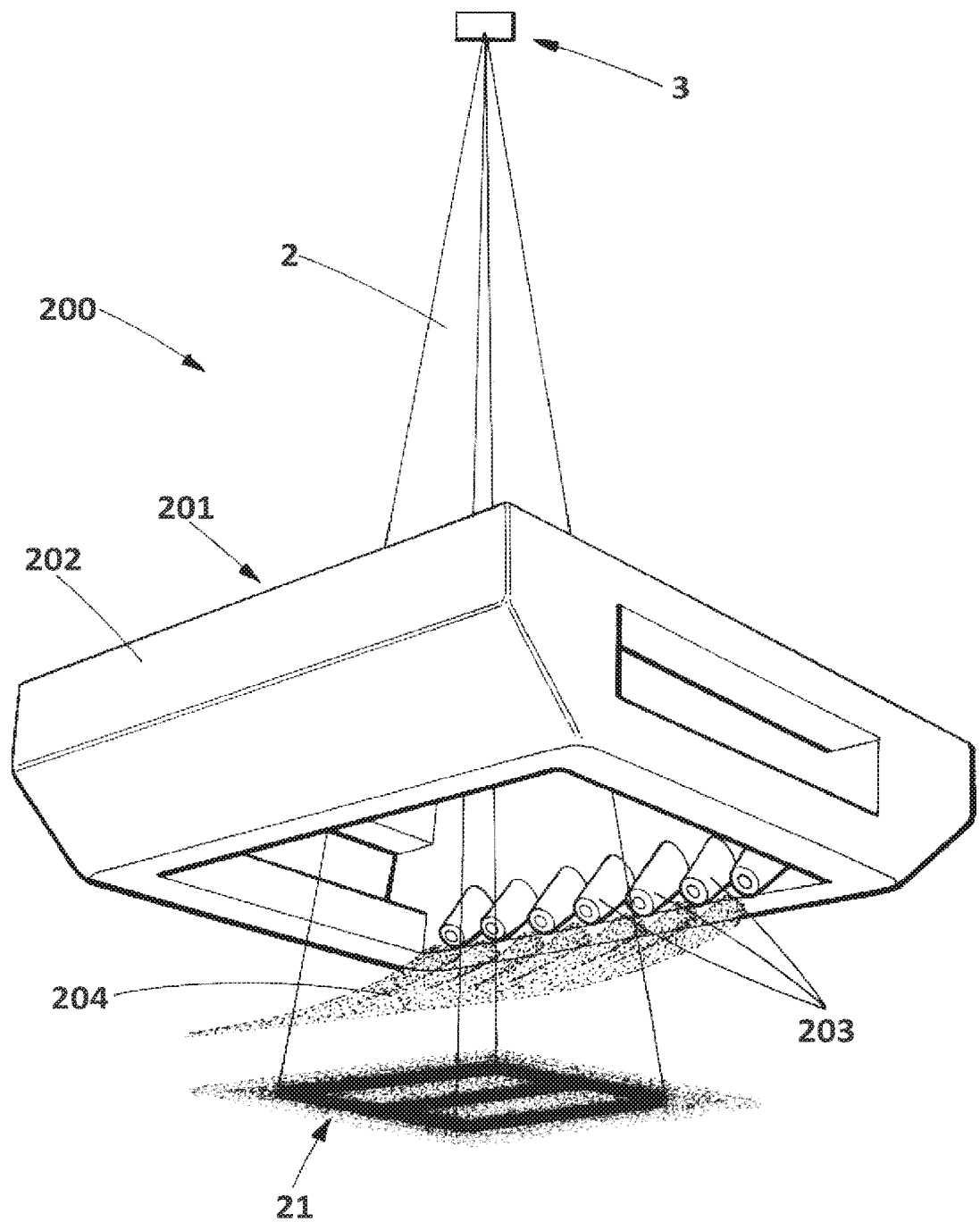
FIG. 3A is a schematic perspective view of a part of a system in accordance with another possible embodiment of the invention.
Figure 3B:
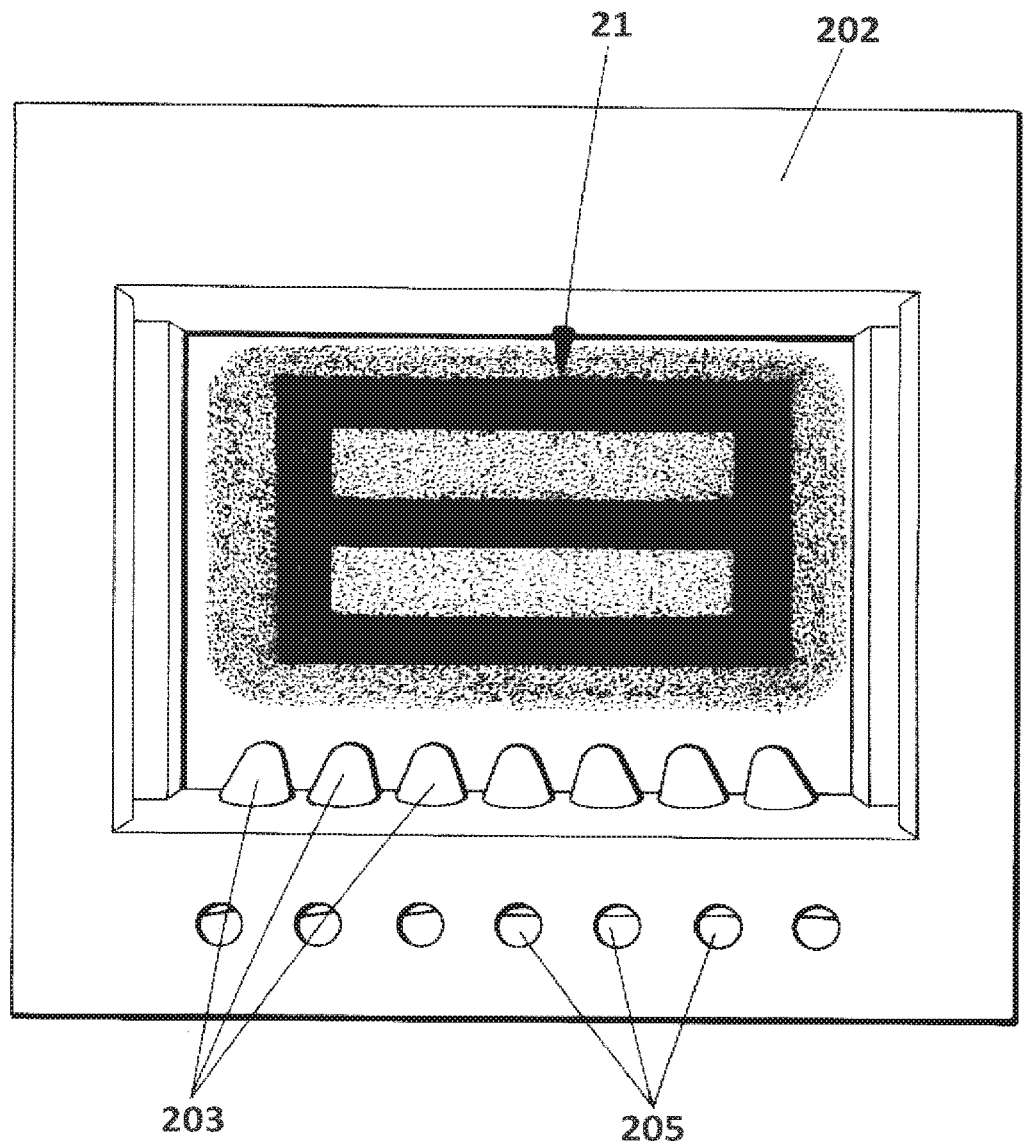
FIG. 3B is a top view of the powder spray head of the system in accordance with the embodiment of FIG. 3A.

FIGS. 3A and 3B illustrate part of the system in accordance with an alternative embodiment of the invention, in which the building material is fed in parallel with the heating thereof using the laser beam and the scanner 3. As illustrated in FIG. 3A, the system comprises an apparatus including a processing head 200 comprising a powder supply head 201 integrated with the scanner 3, the powder supply head 201 comprising a substantially rectangular frame 202 in which a plurality of nozzles 203 are arranged, the nozzles receiving the building material, typically in the form of powder, through channels 205 shown in FIG. 3B. Thus, the building material in powder form 204 is ejected through the nozzles 203, forming a relatively thin film or layer of powder, in correspondence with an opening defined by the frame 202. The scanner 3 projects the laser beam 2 through this opening, and scans the laser beam to produce the effective laser spot 21, as explained above and as schematically shown in FIGS. 3A and 3B. In some embodiments of the invention, the powder supply head 201 and the scanner 3 are arranged to move together, for example, forming part of one and the same device, which can be displaced in relation to the object that is being produced, so that material is thus selectively applied and fused onto this object, in correspondence with the areas in which the object is growing as it is being produced. In FIGS. 3A and 3B, the scanning pattern is schematically illustrated as a pattern in the shape of a "digital 8", that is, with three parallel lines interconnected by two lines at the ends of the three parallel lines.

Figure 4A:
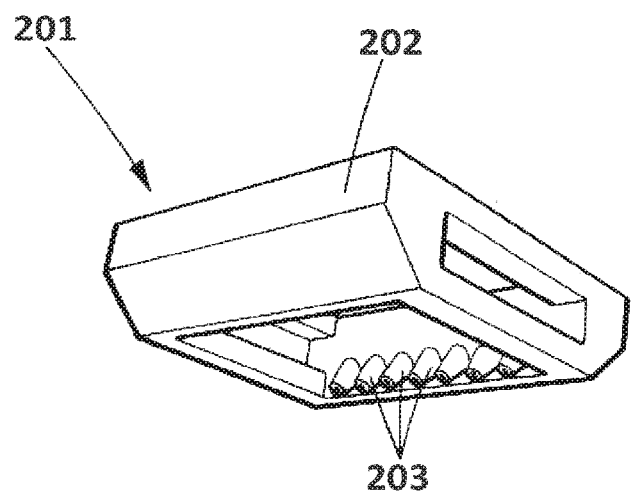
FIGS. 4A-4C schematically illustrate three different powder spray heads in accordance with three different embodiments of the invention.
Figure 4B:
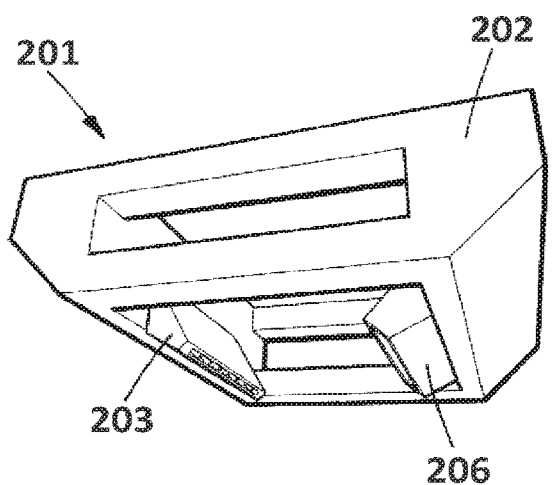
Figure 4C:
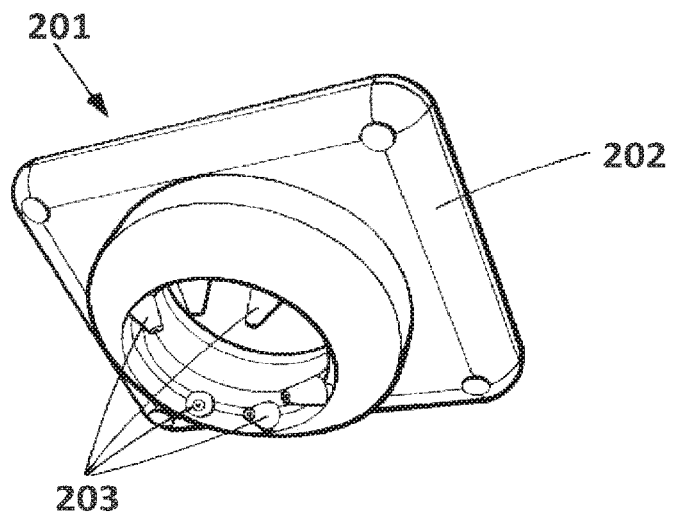

FIGS. 4A, 4B and 4C illustrate some different design options for the powder supply head, corresponding to three different embodiments of the invention. FIG. 4A illustrates the powder supply head in accordance with the embodiments of FIGS. 3A and 3B. FIGS. 4B and 4C illustrate some alternative designs. In all of these cases, there is a frame 202 defining an opening or channel through which the laser beam can be projected onto the powder that is ejected through the nozzles 203. Basically, this approach is in line with some of the so-called coaxial laser and powder nozzles that are known in the art, but with the central opening being large enough so as to allow for the scanning of the laser beam 2 in two dimensions, along the first scanning pattern. In some embodiments of the invention, the processing head including the powder supply head 201 with frame 202 and nozzles 203, as well as the scanner 3, can be displaced so as to displace the effective laser spot in relation to the object being produced. That is, in these embodiments of the invention, the scanner can be used to create the effective laser spot with its two-dimensional energy distribution, whereas the displacement of the processing head 200 with the powder supply head 201 and scanner 3 provides for the displacement of the effective laser spot and the pool. In other embodiments of the invention, the processing head 200 can be fixed and the object being produced can be displaced in relation to the processing head.

The powder supply heads 201 of FIGS. 4A, 4B and 4C all include a plurality of nozzles, arranged to provide a substantially two-dimensional stream of the building material, that is, a stream being relatively thin compared to its extension in the other two directions. Instead of a plurality of nozzles, one wider nozzle can be used. In some embodiments of the invention, the means for spraying the powder can be implemented based on the teachings of US-2011/0168090-A1 and US-2011/0168092-A1.

The powder supply head can also incorporate suction means 206 for recovery of powder that has not been fused by the laser beam, as schematically illustrated in FIG. 4B.

Figure 4D:
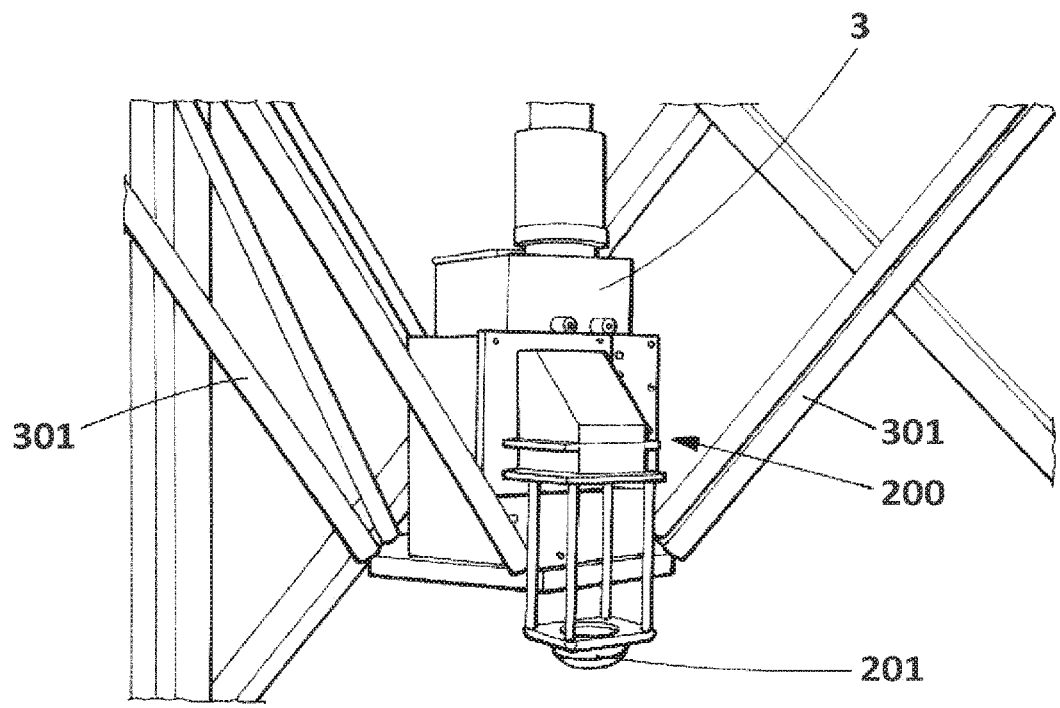
FIGS. 4D and 4E illustrate how the powder spray head can be associated to the scanner allowing the two parts to be displaced jointly in relation to an object being produced.
Figure 4E:
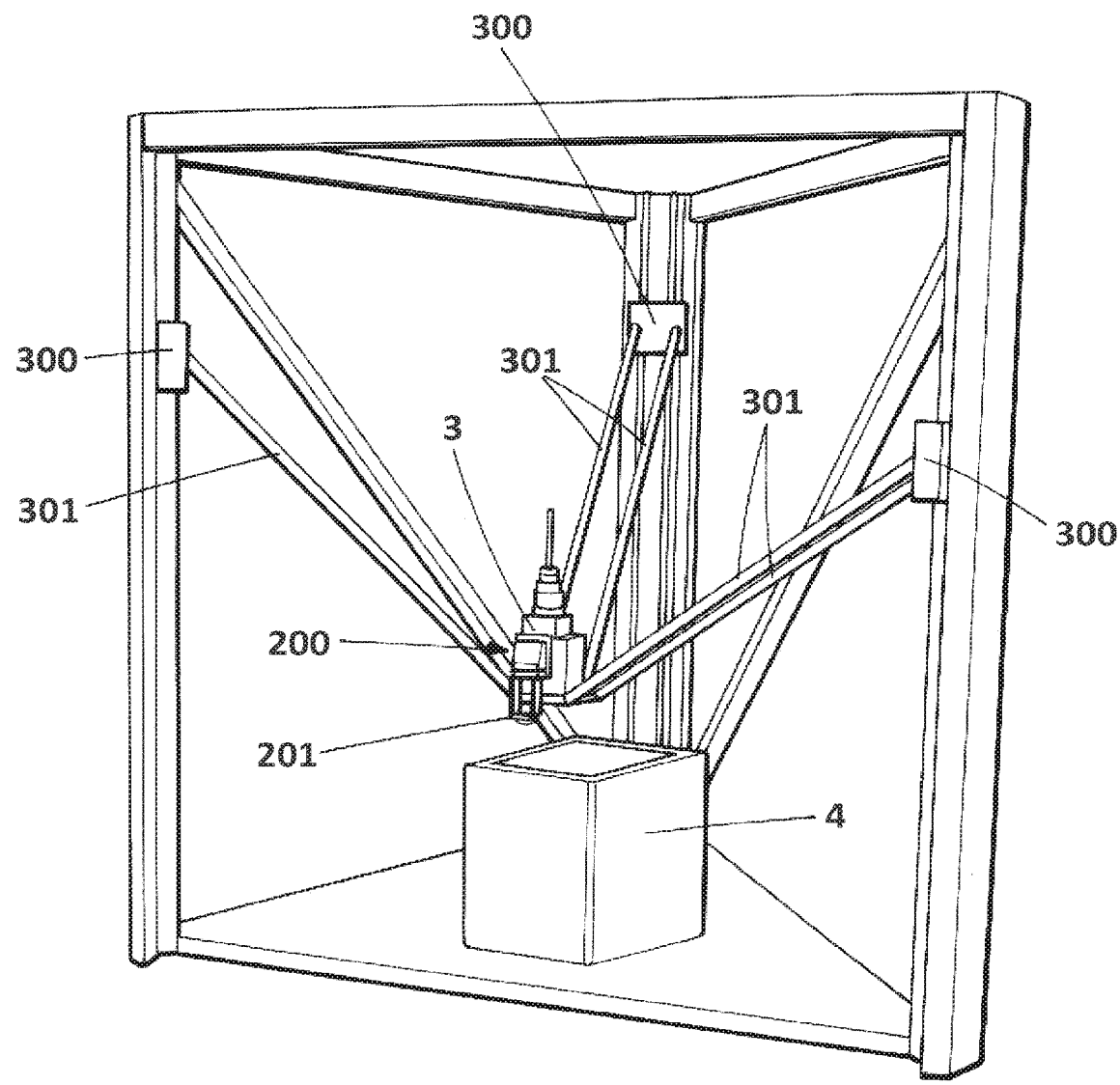

FIGS. 4D and 4E schematically illustrate how the processing head 200, in accordance with one possible embodiment of the invention, can include a scanner 3 placed adjacent to the powder supply head 201, in this case, above it so as to project the laser beam downwards, through the opening in the frame, onto the object 4 that is being produced. The building material is being selectively fused by the laser beam while it is being fed through the nozzles. The processing head 200 is connected to actuators 300 through linkages 301. In this embodiment of the invention, the displacement is based on the parallel manipulator concept. However, any other suitable means of displacement of the processing head can be used. In some embodiments of the invention, it is the object being produced that is displaced in relation to the processing head. Also, a combination of these two approaches can be used.

Figure 5:
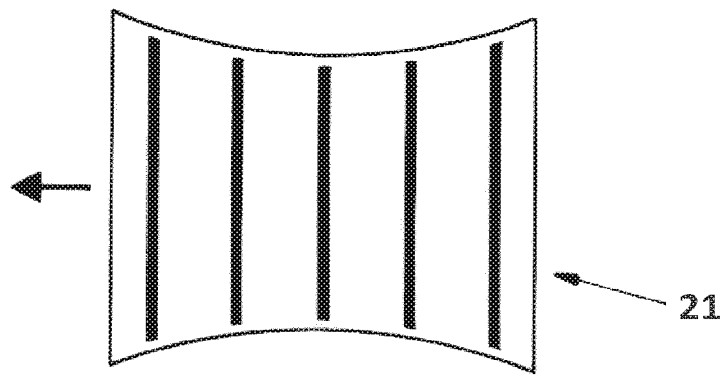
FIG. 5 schematically illustrates an effective spot created by a scanning pattern comprising a plurality of parallel lines.

It has been found that it can often be practical to provide a scanning pattern comprising more than two lines arranged after each other in the direction of travelling of the effective laser spot (that is, the direction of the relative movement between the effective laser spot and the object that is being built), such as schematically illustrated in FIG. 5, where the effective laser spot 21 is created by a plurality of parallel lines, extending in a direction perpendicular to the direction in which the effective laser spot is being displaced in relation to the object being built (this direction is indicated with an arrow in FIG. 5). The lines can have the same or different lengths, and the space between subsequent lines is one of the parameters that can be used to control the two-dimensional energy distribution.

Such a scanning pattern can be created by repetitively scanning the primary laser spot in the direction perpendicular to the direction in which the effective laser spot is travelling, displacing the laser beam a small distance between each scanning step, so as to trace two, three or more parallel lines. Once the primary laser spot has completed the scanning pattern, it will return to its original position and carry out the scanning pattern once again. The frequency with which this occurs is preferably high, so as to avoid undesired temperature fluctuations within the effective laser spot 21.

The laser beam can be switched off while it is being displaced towards a new line to be followed, and/or between finishing the last line of the scanning pattern and returning to the first line of the scanning pattern. However, switching laser beams on and off requires time, and can slow down the scanning frequency. Also, the time during which the laser beam is switched off is time that is lost in terms of efficient use of the laser for heating and fusing.

Figure 6A:
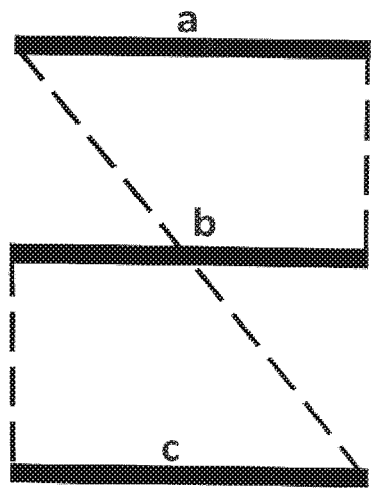
FIGS. 6A and 6B illustrate one possible scanning pattern comprising a plurality of parallel lines.
Figure 6B:
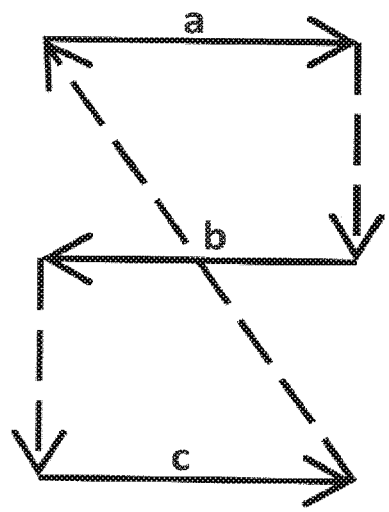

FIGS. 6A and 6B illustrate one possible scanning pattern comprising three main lines a-c (illustrated as continuous lines) of the scanning pattern, and hatched lines illustrating the path which the laser spot follows between said lines. In FIG. 6B, the arrows schematically illustrate the way in which the primary laser spot travels over the surface.

Now, this scanning pattern involves a problem in that the heat distribution will not be symmetric. The same applies if, at the end of the pattern, when finishing the last line c (that is, from the head of the arrow of line c in FIG. 6B), the laser beam returns vertically to line a.

Figure 7A:
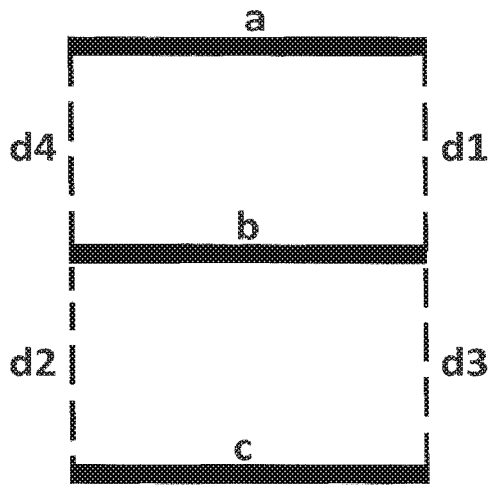
FIGS. 7A and 7B illustrate a scanning pattern for creating an effective spot in accordance with an embodiment of the invention.
Figure 7B:
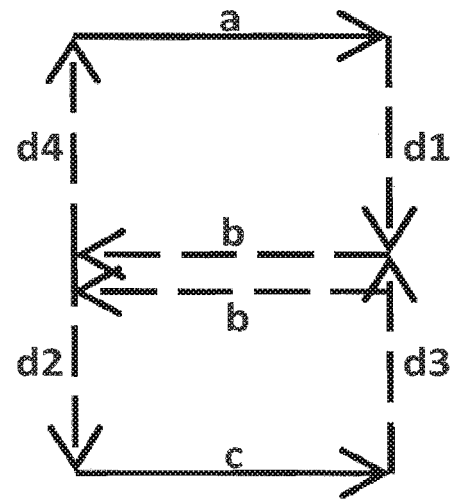

A more symmetrical energy distribution with regard to the axis parallel with the direction in which the effective laser spot is being displaced can be obtained with a scanning pattern as per FIGS. 7A and 7B, likewise comprising three parallel lines a-c interconnected by the lines d followed by the primary laser spot when moving between the three parallel lines. As illustrated in FIG. 7B, the laser beam, from the beginning of the first line a, travels as follows: a-d1-b-d2-c-d3-b-d4.

That is, the primary laser spot travels along the intermediate line b twice as often as it travels through the first line and the last line: it travels along the intermediate line b twice for each time it travels along the first line a and the last line c. Thereby, a completely symmetrical scanning pattern can be obtained, in relation to the axis parallel with the direction in which the effective laser spot is travelling.

The energy distribution along this axis can be set by adjusting, for example, the distance between the lines a-c and the speed with which the laser beam travels along the lines. By adjusting the speed and/or scanning pattern, the energy distribution can be dynamically adapted without turning the laser beam on and off or without substantially modifying the power of the laser beam. For example, if the energy is to be distributed substantially equally throughout the effective laser spot, the laser beam can travel with a higher speed along the intermediate line b than along the first line a and the last line c. For example, the velocity of the primary laser spot along line b can be twice the speed of the primary laser spot along lines a and c. In some embodiments of the invention, the velocity of the effective laser spot along lines d1-d4 can also be substantially higher than the velocity of the effective laser spot along lines a and c.

Thus, tailoring of the energy distribution can be achieved by adapting the distribution of the lines, such as the first, last and intermediate lines a-c, and by adapting the velocity of the laser spot along the different segments a-d (including d1-d4) of the scanning pattern. The distribution of the segments and the velocity of the segments can be dynamically modified while the effective laser spot is being displaced in relation to the object that is being produced, so as to adapt the two-dimensional energy distribution. Also, the scanning pattern can be adapted by adding or deleting segments during the travelling of the effective laser spot.

Figure 8A:
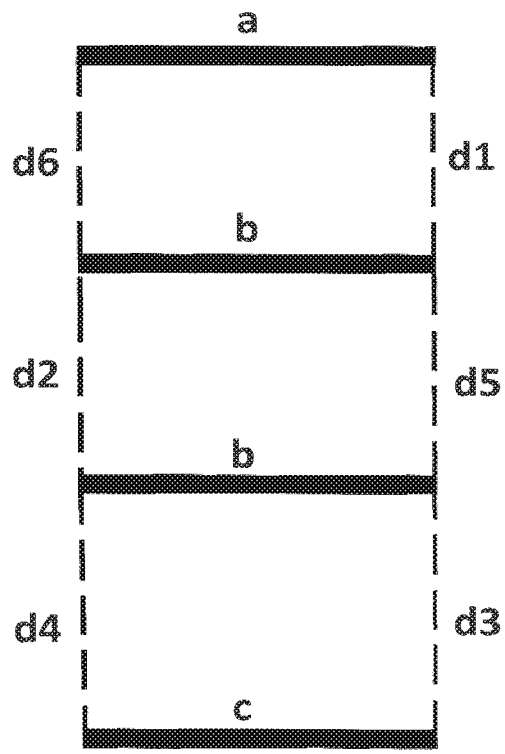
FIGS. 8A and 8B illustrate a scanning pattern for creating an effective spot in accordance with another embodiment of the invention.
Figure 8B:
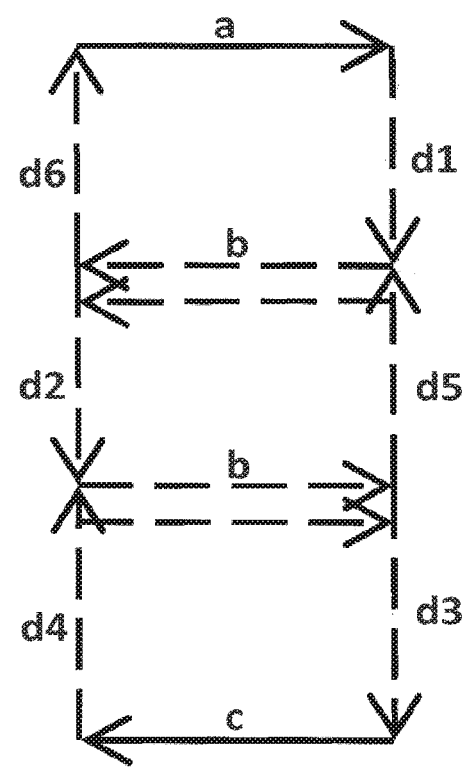

The same principle can be applied to other scanning patterns, such as the scanning pattern of FIGS. 8A and 8B, which includes an additional intermediate line b. Here, the path followed by the primary laser spot s: a-d1-b-d2-b-d3-c-d4-b-d5-b-d6.

Figure 9A:
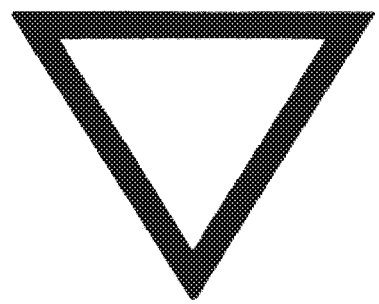
FIGS. 9A-9C illustrate scanning patterns according to other embodiments of the invention.
Figure 9B:
Figure 9C:

FIGS. 9A-9C illustrate some alternative scanning patterns. For example, the first scanning pattern can be a polygon such as the triangle of FIG. 9A, the rectangle of FIG. 9B, and the octagon of FIG. 9C.

Figure 10:
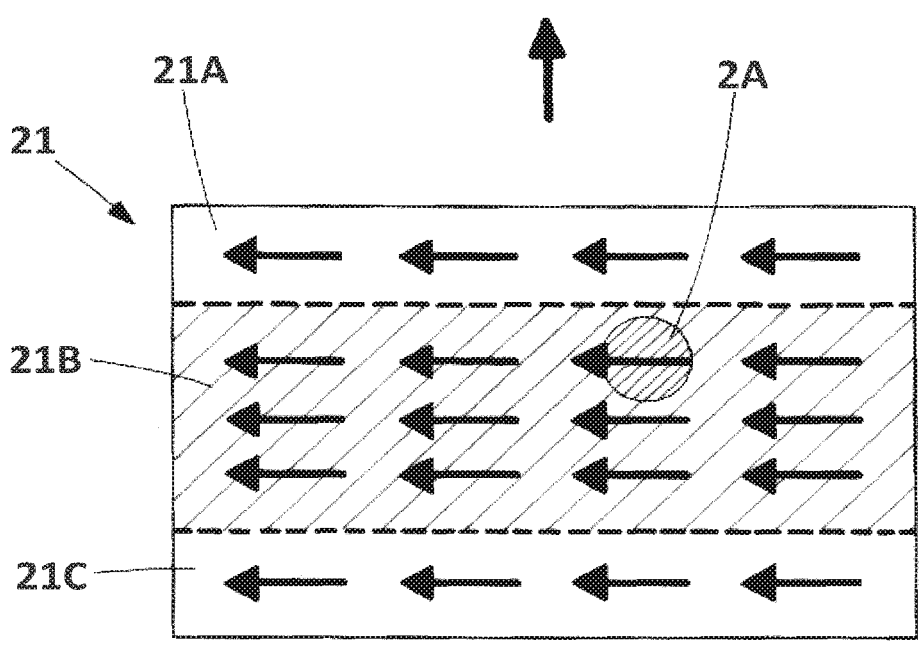
FIG. 10 schematically illustrate an effective spot in accordance with one possible embodiment of the invention.

FIG. 10 schematically illustrates an effective spot 21 in accordance with one possible embodiment of the invention. The effective spot has a substantially rectangular configuration, with a height and a width. The arrow at the top of the figure illustrates the direction in which the effective spot 21 is being displaced.

The effective spot 21 is obtained by scanning the primary spot 2A projected by the beam, following a scanning pattern comprising five parallel lines, indicated by the rows of arrows within the effective spot 21. In this embodiment, a leading portion 21A of the effective spot provides a certain pre-heating of the building material, and a trailing portion 21C is provided to slow down the cooling process. The actual fusion of the material takes place in the central portion 21B of the effective spot 21, that is, between the leading portion 21A and the trailing portion 21C. This central portion 21B corresponds to the pool. That is, as explained above, contrary to what was generally the case in prior art systems, in this embodiment the pool has a two-dimensional configuration with a size substantially larger than the one of the primary spot, and the pool does not travel with the primary spot 2A along the first scanning pattern, but rather with the effective spot 21. The size and/or the shape of the effective spot 21 and/or of the pool 21B can be dynamically adapted during the displacement of the effective spot along the track followed by the effective spot 21, for example, taking into account the configuration of the object to be produced in the region where heating is taking place.

Figure 11A:
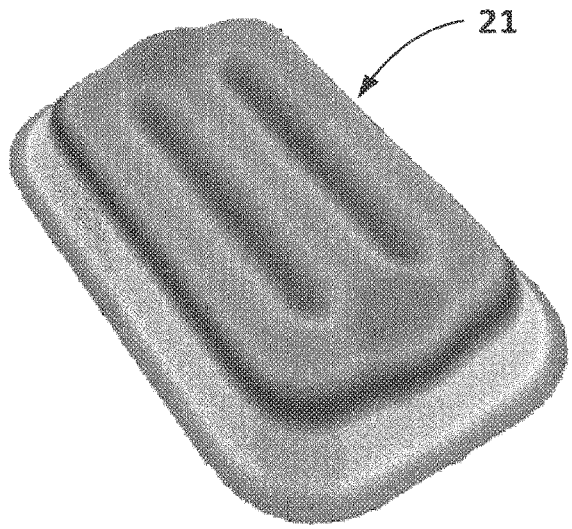
FIGS. 11A-11D schematically illustrate different two-dimensional energy distributions of an effective spot in accordance with an embodiment of the invention.
Figure 11B:
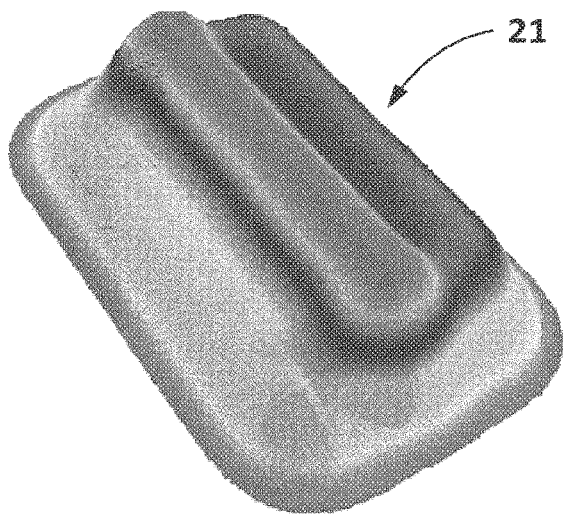
Figure 11C:
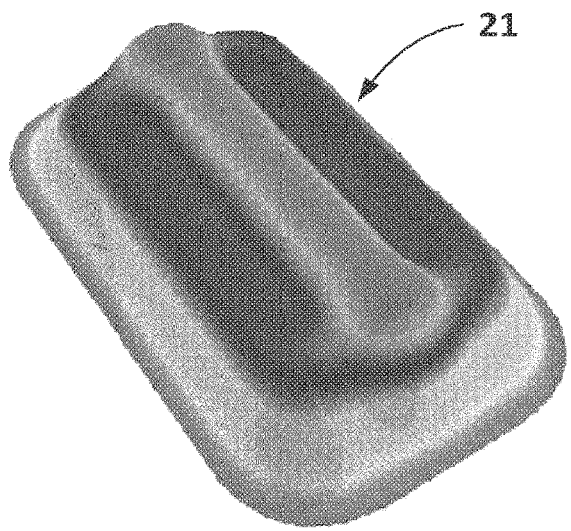
Figure 11D:
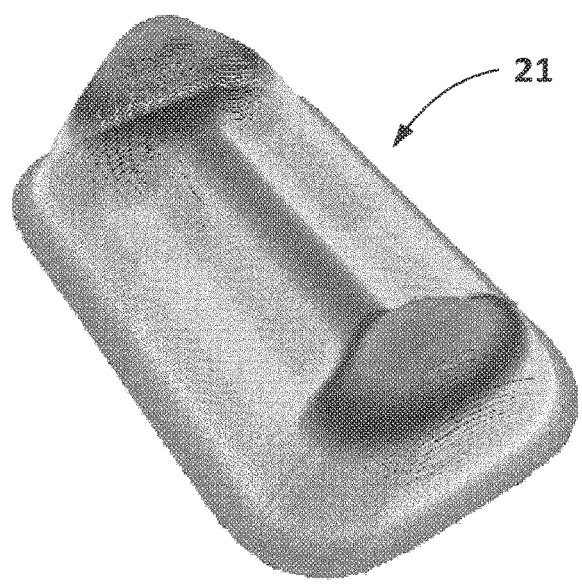

FIGS. 11A-11D schematically illustrate different two-dimensional energy distributions of an effective spot in accordance with an embodiment of the invention. For example, FIG. 11A illustrates an effective spot featuring three bands extending across the effective spot, in the direction perpendicular to the direction of travelling of the effective spot. These three bands represent areas with high energy density. The first band may be intended to provide for pre-heating of the material to be fused, the second band may be intended to provide for the actual fusion, and the third band may be intended for post-treatment of the fused material, for example, to relieve tensions. Other energy distributions are schematically shown in FIGS. 11B-11D. The two-dimensional energy distribution can be adapted dynamically, for example, adding or removing bands with high energy density, etc. For example, FIG. 11F illustrates a two-dimensional energy distribution with enhanced energy density towards the sides of the effective spot. This can often be preferred in order to provide for a substantially constant temperature along the track, in spite of the fact that, for example, heat dissipation away from the track may be higher at the edges of the track.

Feedback, such as feed-back based on thermal imaging, can be used to trigger the dynamic adaptation of the two-dimensional energy distribution, for example, so as to achieve and maintain a desired temperature distribution in the area being treated.

FIGS. 12A-12G illustrate an example of how the two-dimensional energy distribution of an effective spot 21 can be adapted while the effective spot is being displaced along a track (in a direction schematically illustrated with an arrow in FIG. 12A), over a layer 106 of building material. FIG.

Figure 12A:
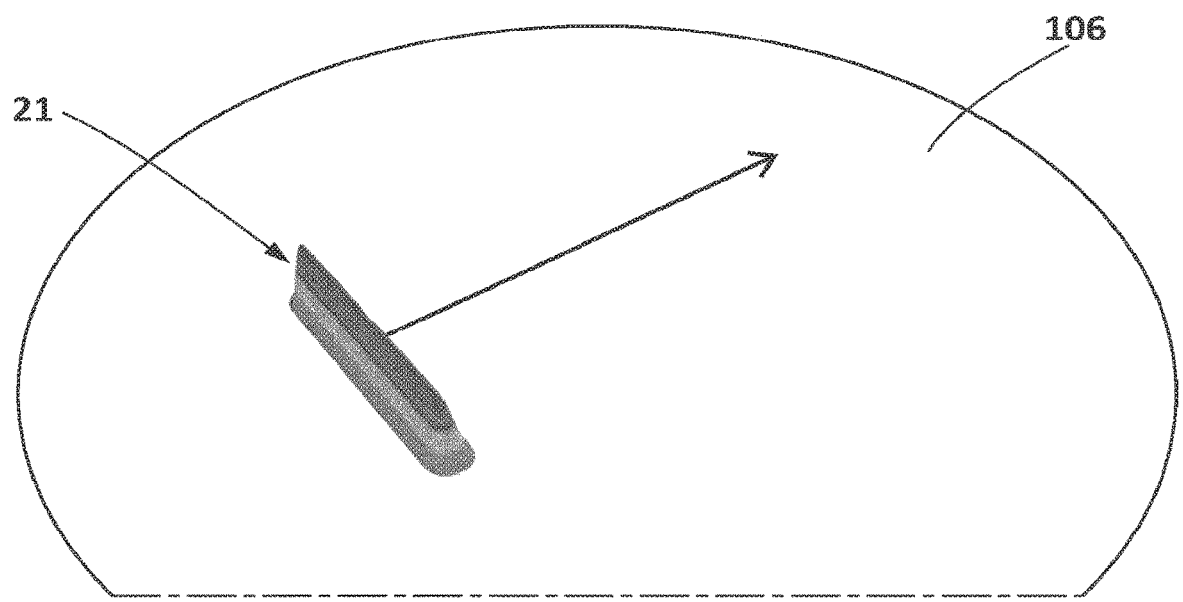
FIGS. 12A-12G schematically illustrate how the two-dimensional energy distribution of an effective spot is dynamically adapted during a sweep of the effective spot along a track, in accordance with an embodiment of the invention.
Figure 12B:
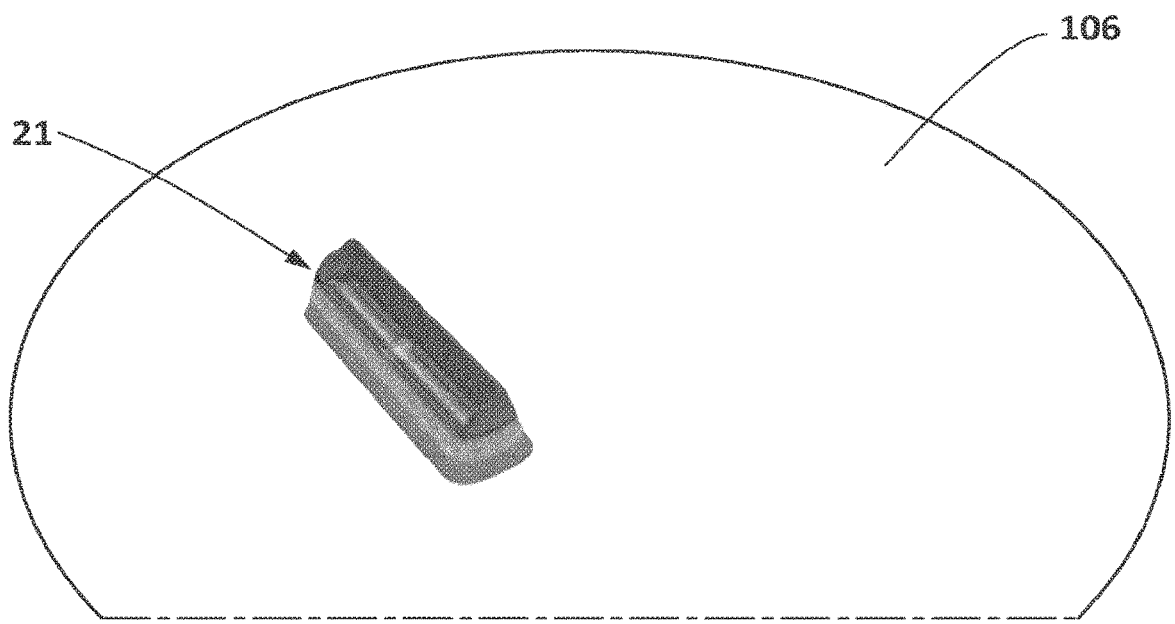

12A illustrates how the effective spot 21 is first applied to the building material 106 and starts to heat the building material, and in FIG. 12B the two-dimensional energy distribution has been modified so that the effective spot has increased in length along the track (in the direction of the arrow in FIG. 12A), featuring a leading portion with high energy density so as to provide for a rapid increase of the temperature of the building material when the leading portion reaches the building material.

Figure 12C:
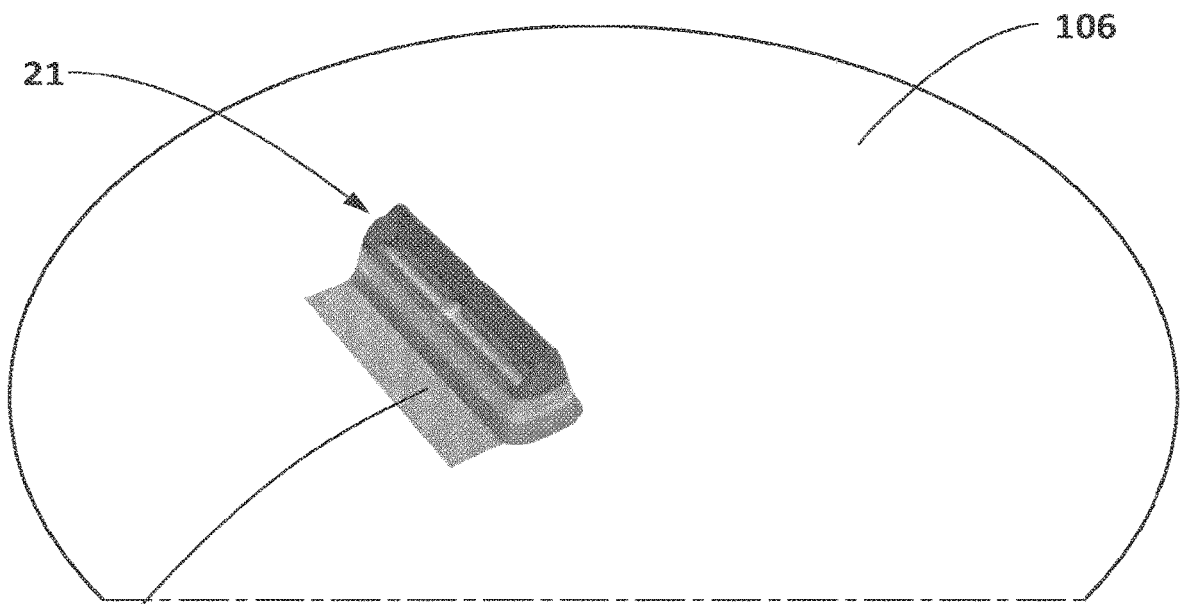

In FIG. 12C, the effective spot 21 has moved along the track also with its trailing edge, and a fused portion 11A of the building material can be observed behind the effective spot 21.

Figure 12D:
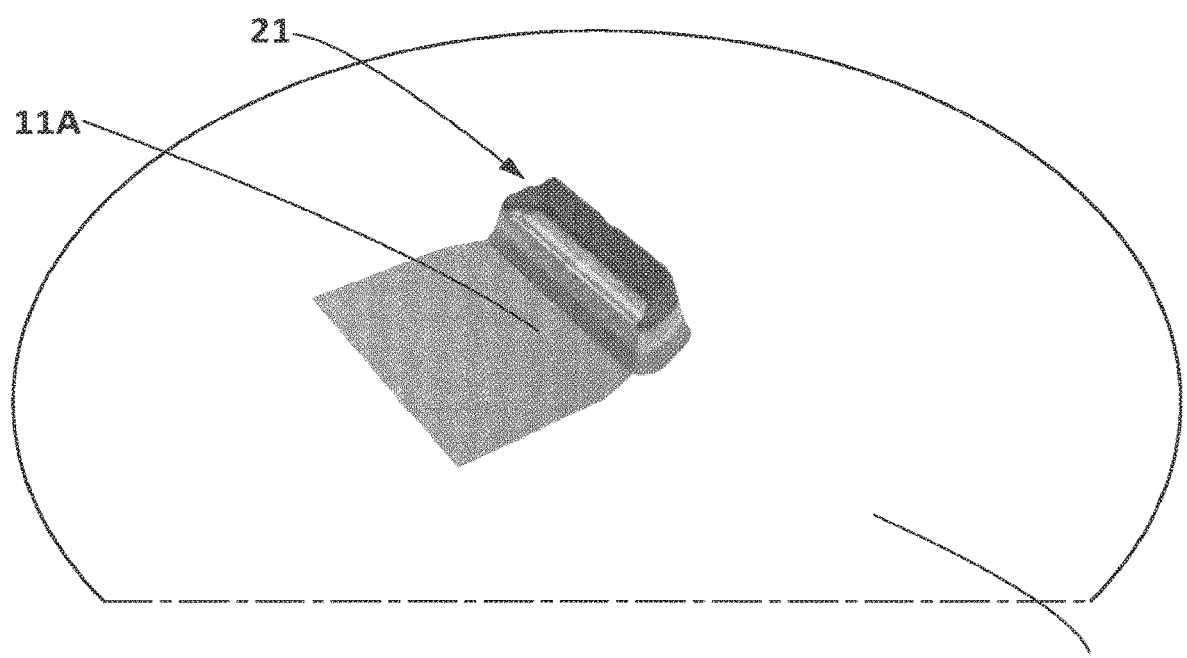
Figure 12E:
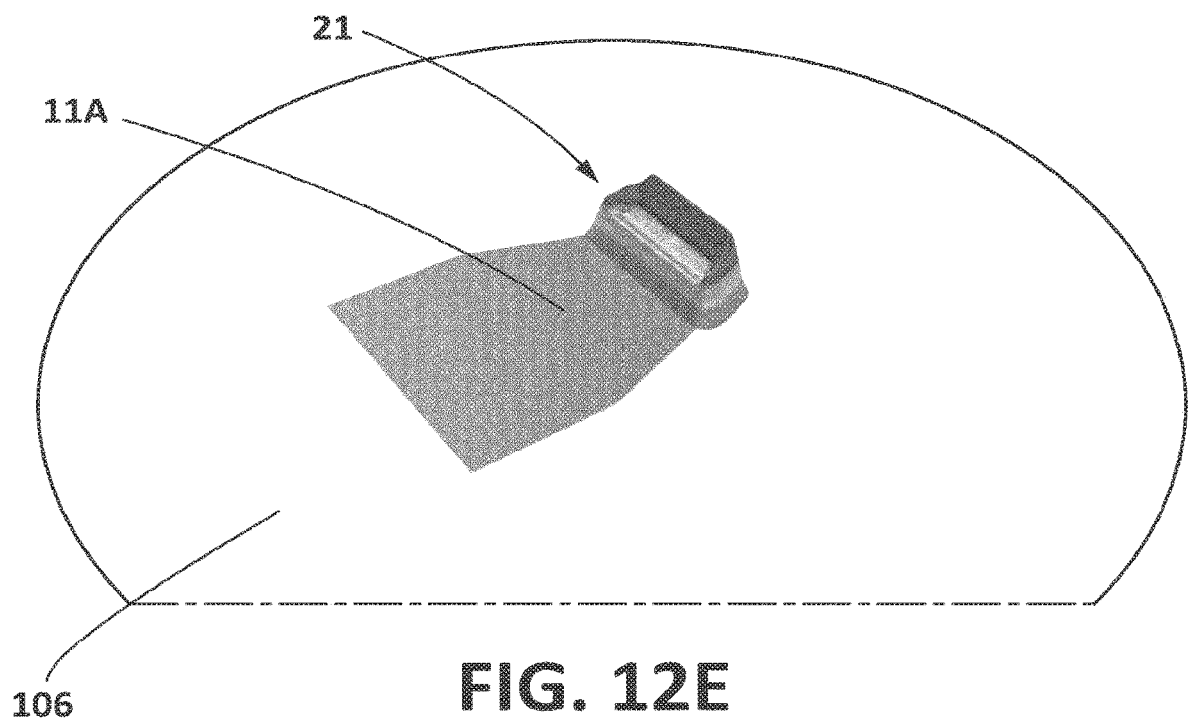
Figure 12F:
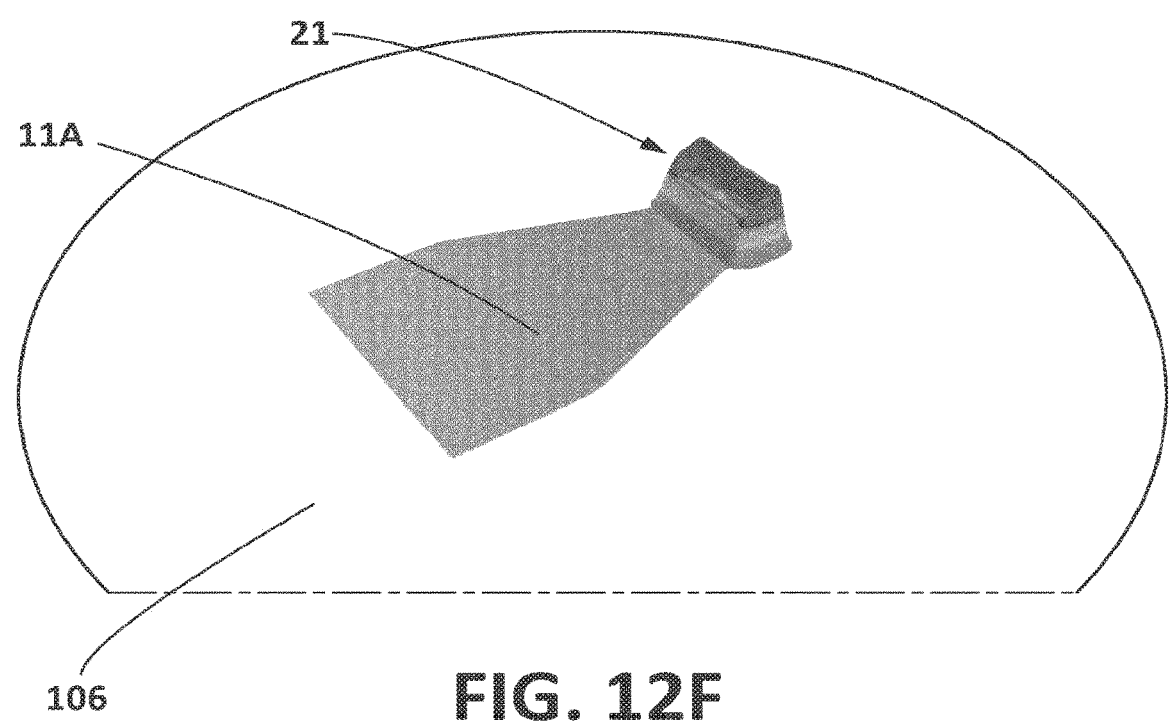

In FIG. 12D, the effective spot has reached a section of the object being produced in which the portion of the object begins to decrease in width, that is, a portion where the track to be fused progressively becomes narrower. Here, the two-dimensional energy distribution is dynamically adapted to adapt itself to the dimensions of the portion of the object being produced at each moment. As shown in FIGS. 12D and 12E, the two-dimensional energy distribution is adapted so that the effective spot progressively grows narrower, and in addition, also the edges of the effective spot feature an outline corresponding to the shape of the portion being fused. That is, here, the projection of the effective spot onto the building material is substantially wedge-shaped.

Figure 12G:
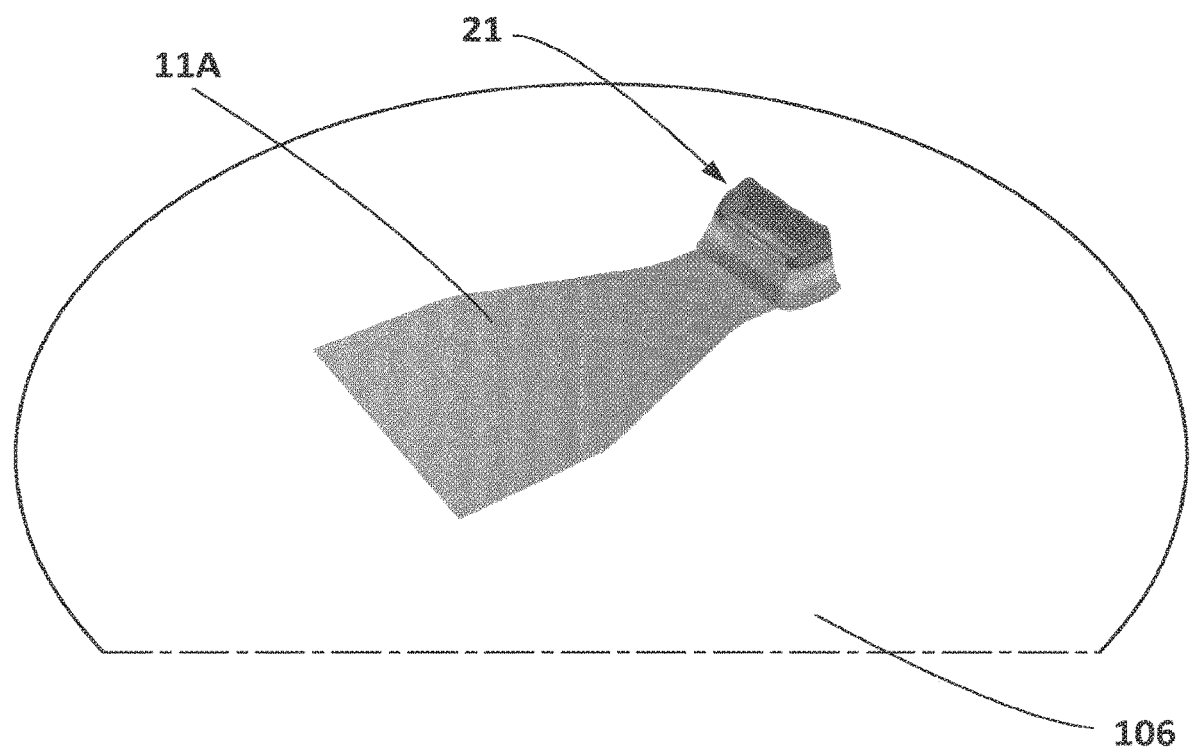

In FIG. 12E, the effective spot 21 has reached a position where the object being built has a portion of constant width. Here, the two-dimensional energy distribution is adapted accordingly. Here, the projection of the effective spot onto the building material 106 becomes substantially rectangular. In FIG. 12G, the effective spot can be seen moving further along the track. Thus, it can be seen how the shape of the fused material 11A corresponds to the way in which the two-dimensional energy distribution of the effective spot has been dynamically adapted as the effective spot 21 has moved along the track. However, the present invention is obviously not limited to this kind of dynamical adaptations of the effective spot and its two-dimensional energy distribution.

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

The invention claimed is:

1. A method for producing an object by successive fusing of a building material, the method comprising the steps of:
   a) supplying building material to a fusing site;
   b) generating a light beam and directing it at a selected spot on the building material, creating a primary spot;
   c) repetitively scanning the light beam primary spot in two dimensions in accordance with a first scanning pattern establishing an effective spot larger than the primary spot on the building material the two-dimensional scanning being at a mean velocity at least ten times higher than the mean velocity the effective spot is displaced on the building material, the effective spot having a two-dimensional energy distribution; and
   d) displacing the effective spot at a mean velocity on the building material in accordance with a second scanning pattern to progressively fuse the building material;
   whereby the object is produced.

2. The method according to claim 1, wherein the two-dimensional energy distribution of the effective spot is dynamically adapted during displacement of the effective spot on the building material, in accordance with the second scanning pattern.

3. The method of claim 2, wherein the two-dimensional energy distribution of the effective spot is dynamically adapted during displacement of the effective spot along a track, to change the width of the effective spot to correspond with a portion of the object being produced.

4. The method according to claim 2 wherein adaptation of the two-dimensional energy distribution of the effective spot is carried out by changing the power of the beam.

5. The method according to claim 2 wherein adaptation of the two-dimensional energy distribution of the effective spot is carried out by changing the first scanning pattern.

6. The method according to claim 2 wherein adaptation of the two-dimensional energy distribution of the effective spot is carried out by changing the velocity of the primary spot moving along the first scanning pattern.

7. The method according to claim 1 wherein the size of the primary spot is dynamically adapted during displacement of the primary spot along the first scanning pattern and/or during displacement of the effective spot on the object being produced.

8. The method according to claim 1 wherein
   the effective spot has a leading portion with a higher energy density than a trailing portion, or
   the effective spot has a leading portion with a lower energy density than a trailing portion, or
   the effective spot has an intermediate portion with a higher energy density than the leading portion and the trailing portion, or
   the effective spot has a substantially constant energy density throughout the effective spot.

9. The method according to claim 1 wherein the mean velocity of the primary spot along the first scanning pattern is higher than the mean velocity of the effective spot displaced on the building material.

10. The method according to claim 1 wherein the beam is scanned at a frequency of more than 10 Hz in the first scanning pattern.

11. The method according to claim 1 wherein the size of the effective spot is more than 4 times the size of the primary spot.

12. The method according to claim 1 wherein the steps of the method are carried out repeatedly in a plurality of cycles.

13. The method according to claim 1 wherein steps a) and b) are carried out in parallel.

14. The method according to claim 1 wherein the first scanning pattern comprises a plurality of lines.

15. The method according to claim 14, wherein the lines are substantially parallel lines.

16. The method according to claim 1 wherein the first scanning pattern is a polygon.

17. The method according to claim 1 wherein the first scanning pattern comprises at least three linear segments and scanning of the beam causes the beam to follow at least one of the segments more frequently than it follows another one of the segments.

18. The method according to claim 17, wherein the first scanning pattern comprises at least three substantially parallel lines distributed one after the other in a first direction, and extending in a second direction, and three lines comprising a first line, an intermediate line, and a last line arranged one after the other in the first direction, wherein scanning of the beam causes the beam to follow the intermediate line more frequently than the beam follows the first line or the last line.

19. The method according to claim 17, wherein the first scanning pattern comprises at least three substantially parallel lines distributed one after the other in a first direction, and extending in a second direction, the three lines comprising a first line, an intermediate line, and a last line arranged one after the other in the first direction, wherein scanning of the beam causes the beam to follow the first line, follow the intermediate line, follow the last line, follow the intermediate line, and follow the first line (a), in that order.

20. The method according to claim 18 wherein the first scanning pattern comprises a plurality of the intermediate lines (b), and/or the beam is displaced with a higher velocity along the intermediate line than along the first line and last line, and/or wherein the first scanning pattern further comprises lines extending in the first direction, between the ends of the first, last and intermediate lines, the beam (2) following the lines extending in the first direction when moving between the first line, the intermediate lines and the last line, and/or the beam is displaced with a higher velocity along the lines extending in the first direction, than along the first line and the last line.

21. The method according to claim 1 wherein the beam is displaced along the first scanning pattern with the power of the beam substantially constant.

22. The method according to claim 1 wherein the beam creates a melt pool corresponding to the effective spot, the melt pool being displaced in accordance with the displacement of the effective spot on the building material.

23. The method according to claim 1 wherein the light beam is a laser beam.

24. The method according to claim 23, wherein the power of the laser beam is higher than 1 kW.

25. The method according to claim 1, wherein the mean velocity of movement of the light beam primary spot along the first scanning pattern is at least 100 times higher than the mean velocity with which the effective spot is displaced on the building material in accordance with the second scanning pattern.

26. The method according to claim 1 wherein the effective spot has a width in a direction perpendicular to a direction in which the effective spot is displaced, the width of the effective spot being modified during displacement on the building material.

* * * * *